(12) United States Patent
Sato

(10) Patent No.: US 8,587,835 B2
(45) Date of Patent: Nov. 19, 2013

(54) IMAGE PROCESSING APPARATUS, METHOD, AND PROGRAM PRODUCT USING DIFFERENCE IN COUNT OF PIXELS IN MARGIN AND IMAGE AREAS BASED ON GRADATION VALUE TO DETERMINE IF DOCUMENT IS WHITE PAPER

(75) Inventor: Yoshikazu Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 136 days.

(21) Appl. No.: 13/368,132

(22) Filed: Feb. 7, 2012

(65) Prior Publication Data

US 2012/0206776 A1    Aug. 16, 2012

(30) Foreign Application Priority Data

Feb. 10, 2011    (JP) .................... 2011-027319

(51) Int. Cl.
*H04N 1/00*      (2006.01)
*H04N 1/40*      (2006.01)
*G06K 15/02*     (2006.01)
*G06F 3/12*      (2006.01)

(52) U.S. Cl.
CPC ....... *H04N 1/00005* (2013.01); *H04N 1/00034* (2013.01); *H04N 1/00724* (2013.01); *H04N 1/0044* (2013.01); *H04N 1/00742* (2013.01); *H04N 1/00803* (2013.01); *H04N 1/40062* (2013.01); *G06K 15/1867* (2013.01); *G06K 15/1882* (2013.01); *G06F 3/1218* (2013.01); *G06F 3/1256* (2013.01)
USPC ......... 358/3.24; 358/1.18; 358/406; 358/453; 358/464; 358/468

(58) Field of Classification Search
USPC ............... 358/1.9, 3.24, 1.14, 1.18, 501, 504, 358/530, 538, 401, 406, 426.06, 448, 453, 358/462, 464, 465, 468; 382/168, 173, 176, 382/270–273, 282, 286
See application file for complete search history.

(56) References Cited

U.S. PATENT DOCUMENTS

| | | | |
|---|---|---|---|
| 8,125,693 B2 * | 2/2012 | Arai | 358/462 |
| 8,170,336 B2 * | 5/2012 | Kubota | 382/168 |
| 8,260,043 B2 * | 9/2012 | Kubota | 382/168 |
| 2005/0190382 A1 * | 9/2005 | van Os | 358/1.14 |
| 2009/0066979 A1 * | 3/2009 | Takeishi | 358/1.9 |
| 2010/0053682 A1 * | 3/2010 | Gotoh et al. | 358/1.15 |
| 2012/0120432 A1 * | 5/2012 | Hirohata et al. | 358/1.13 |
| 2012/0170082 A1 * | 7/2012 | Labois et al. | 358/474 |

FOREIGN PATENT DOCUMENTS

| | | | |
|---|---|---|---|
| JP | 11-284846 A | 10/1999 | |
| JP | 2002-165054 A | 6/2002 | |

* cited by examiner

*Primary Examiner* — Scott A Rogers
(74) *Attorney, Agent, or Firm* — Canon U.S.A., Inc. IP Division

(57) ABSTRACT

An apparatus includes an input unit configured to read a document and input image data, a division unit configured to divide the image data into a margin area and a print information area, an acquisition unit configured to count a number of pixels having a gradation value greater than a first threshold value in each divided area, and acquire the number of counted pixels per unit area, and a determination unit configured to determine that the document is white paper if a difference of two acquired pixel numbers per unit area is smaller than a second threshold value.

13 Claims, 21 Drawing Sheets

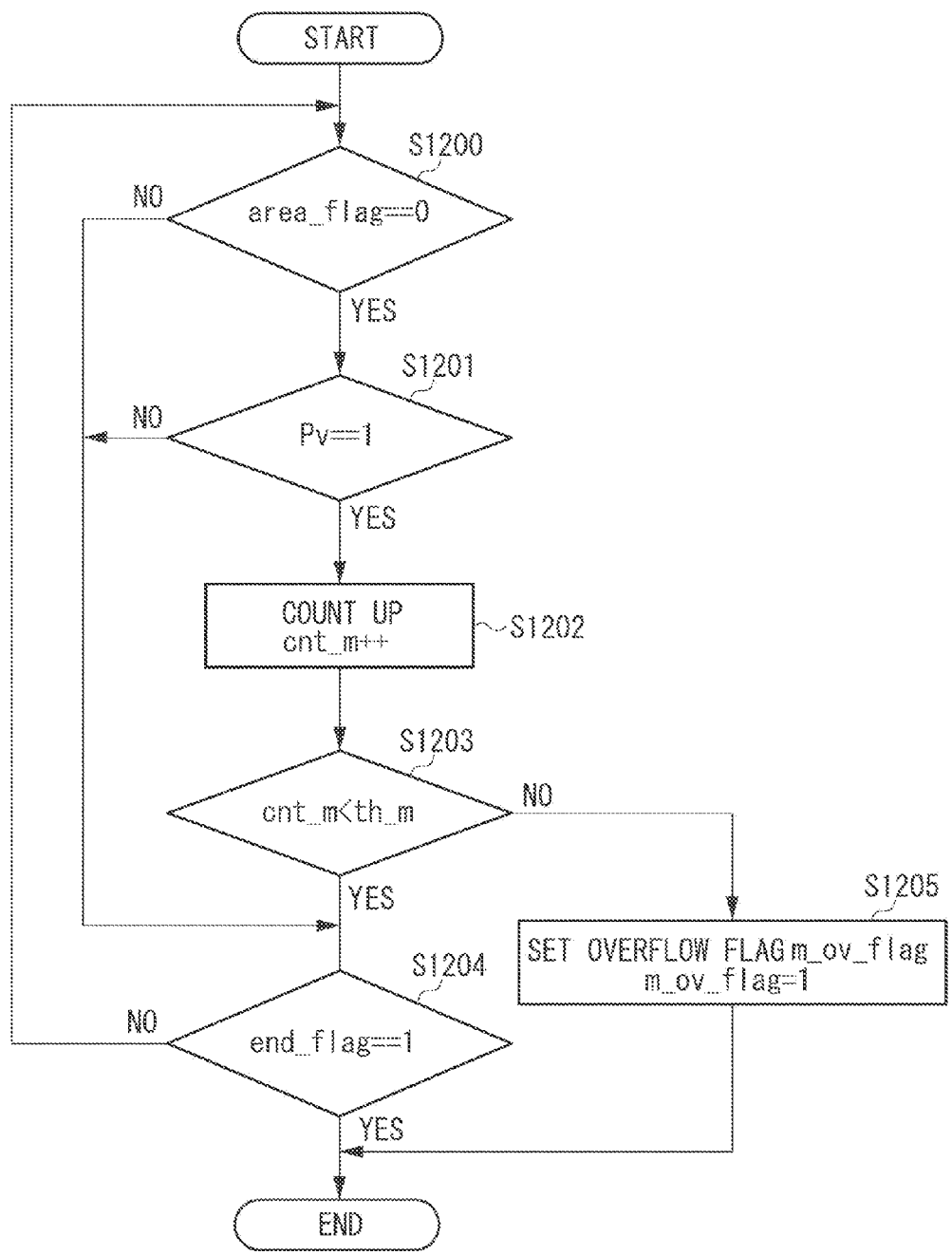

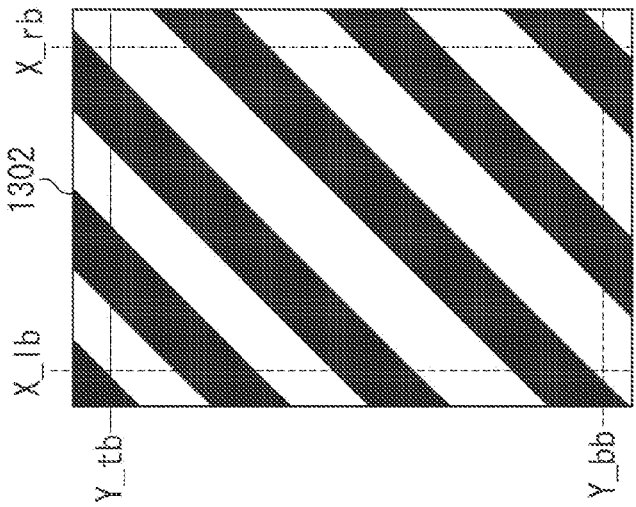
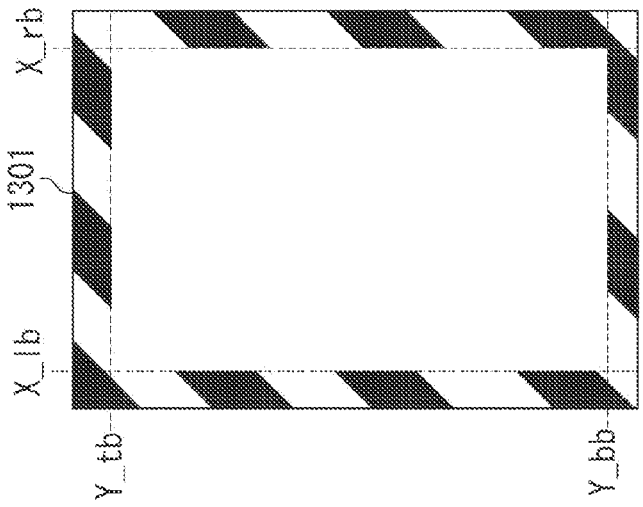
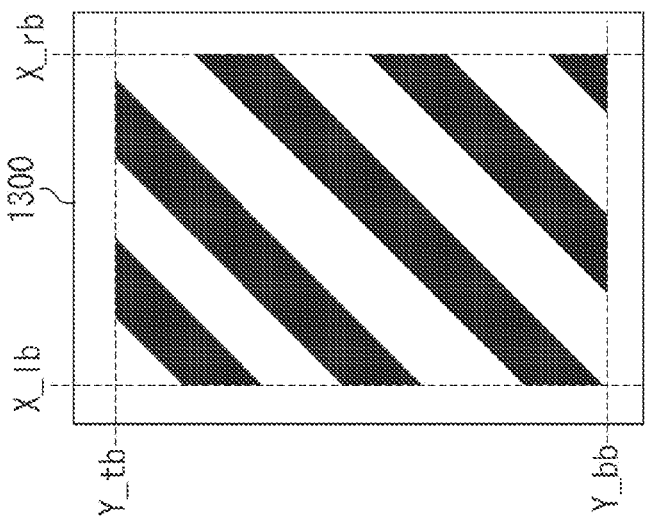

IMAGE PROCESSING APPARATUS, METHOD, AND PROGRAM PRODUCT USING DIFFERENCE IN COUNT OF PIXELS IN MARGIN AND IMAGE AREAS BASED ON GRADATION VALUE TO DETERMINE IF DOCUMENT IS WHITE PAPER

BACKGROUND OF THE INVENTION

1. Field of the Invention

The present invention relates to a white paper detection method of an image processing apparatus.

2. Description of the Related Art

When a user transmits facsimile or makes a copy of a document by a digital multifunction peripheral, in some cases, a wrong face of the document is unintentionally set by the user or white paper is unintentionally included in the documents to be transmitted or copied. Under such circumstances, a technique referred to as "white paper detection" is generally used. Japanese Patent Application Laid-Open No. 11-284846 discusses a technique that realizes detection of white paper by dividing a scanned image into blocks and calculating a ratio of black pixels in each block.

Further, Japanese Patent Application Laid-Open No. 2002-165054 discusses a technique capable of handling a color document in addition to detection of a white paper document. The technique is useful in determining whether the document includes an object to be read by comparing the change in the number of black pixels which have been read for each line in the main scanning direction and a threshold value. More specifically, the black pixels in the document is read for each line, and if the amount of change of the number of black pixels for one line is smaller than the threshold value, the document to be scanned is determined that it is the white paper document that does not include an object.

In recent years, environmental issues have received widespread attention, and the use of environmentally-friendly recycled paper has increased in documents to be used in printing. In some cases, foreign substances in the material of the recycled paper can be visually recognized. Such recycled paper and poor-quality paper including especially high ratio of foreign substance is also used for printing. (In the description below, both the recycled paper and the poor-quality paper are collectively referred to as low-quality paper.)

In this manner, the use of low-quality paper as document paper has increased. From the viewpoint of white paper detection, it is desirable to be able to maintain the detection accuracy even when the low-quality paper is used. However, regarding conventional techniques, if the paper quality of the document is low and a great number of foreign substances are included in the paper, it is difficult to accurately detect the white paper. This is because, according to the technique discussed in Japanese Patent Application Laid-Open No. 11-284846, if the document includes a great number of foreign substances, it is difficult to distinguish between black pixels that indicate foreign substances and black pixels that indicate the document content. Further, regarding the technique discussed in Japanese Patent Application Laid-Open No. 2002-165054, if a great number of foreign substances are included in the paper and the amount of change of the black pixels in one line is increased, it is difficult to determine whether the document to be read is a document including print information or a white paper document.

Further, although the setting of a threshold value for white paper detection can be changed when low-quality paper is used, if the documents to be read are a mixture of low-quality paper and high-quality paper, since an optimum threshold value differs according to the documents, it is difficult to accurately perform the white paper detection for all the documents.

Further, although a pixel with a density lower than a certain density can be rounded to a white pixel, since the density of the pixel that corresponds to the document content cannot be distinguished from the density of the pixel of the foreign substance, it is difficult to round only the pixel of the foreign substance to a white pixel.

SUMMARY OF THE INVENTION

According to an aspect of the present invention, an apparatus includes an input unit configured to read a document and input image data, a division unit configured to divide the image data into a margin area and a print information area, an acquisition unit configured to count a number of pixels having a gradation value greater than a first threshold value in each divided area, and acquire the number of counted pixels per unit area, and a determination unit configured to determine that the document is white paper if a difference of two pixel numbers per unit area is smaller than a second threshold value.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 12 is a flowchart illustrating processing of a margin area pixel count unit according to the first exemplary embodiment.

FIG. 13A illustrates an example of an image whose count value exceeds an upper limit threshold value of the print information area. FIG. 13B illustrates an example of an image whose count value exceeds an upper limit threshold value of the margin area. FIG. 13C illustrates an example of an image whose count value exceeds an upper limit threshold value of the print information area and the margin area.

DESCRIPTION OF THE EMBODIMENTS

Various exemplary embodiments, features, and aspects of the invention will be described in detail below with reference to the drawings.

According to a first exemplary embodiment, white paper means a document that does not include a significant object such as a character, a photograph, or a graphic, in other words, a document without print information. If print information is not included, a color paper document and a recycled paper document will be treated as white paper. Further, image data obtained by reading such documents is also referred to as white paper.

Figure 1:
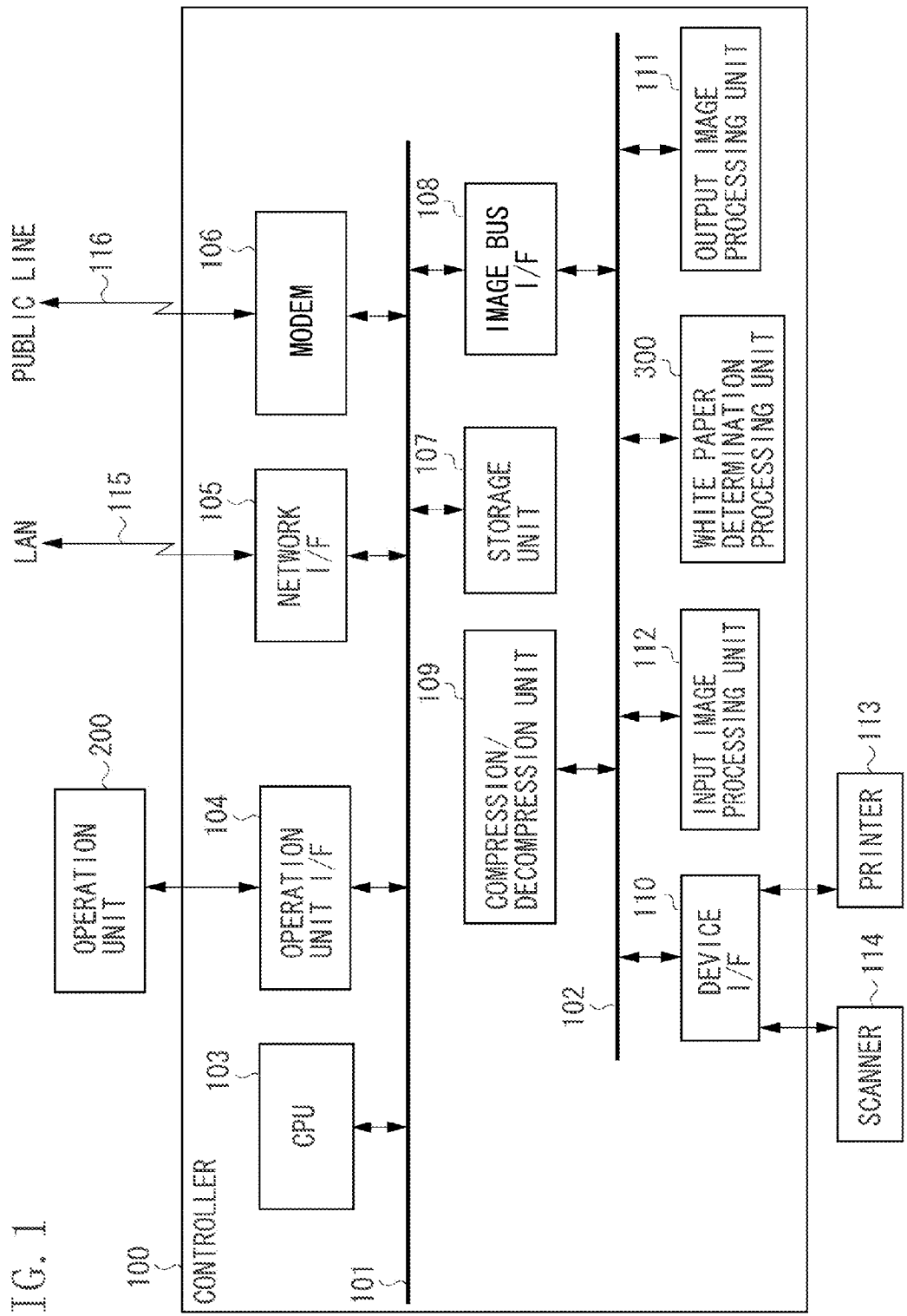
FIG. 1 is a block diagram illustrating a control system of a digital multifunction peripheral.

FIG. 1 illustrates a configuration example of an image processing control system of a digital multifunction peripheral that realizes the present exemplary embodiment.

A controller 100 is connected to a scanner 114 as an image input device and a printer 113 as an image output device. Further, the controller 100 is connected to a local area network (LAN) 115 and a public line 116 and controls input/output of image data and device information.

A central processing unit (CPU) 103 serves as a controller the entire image processing control system. A storage unit 107 stores image data and compressed data. A system work memory which is used by the CPU 103 is also stored in the storage 107.

An operation unit interface (I/F) 104 is an interface unit which is connected to an operation unit 200. Image data to be displayed on the operation unit 200 is output to the operation unit 200 via the operation unit I/F 104. Further, information input by the user via the operation unit 200 is transferred to the CPU 103 via the operation unit I/F 104. Detailed description of the operation unit 200 will be given below.

A network I/F 105 is connected to the LAN 115 and is used for input/output of information. A modem 106 is connected to the public line 116 and performs modulation-demodulation processing when data is transmitted and received. The above-described units are configured on a system bus 101.

An image bus I/F 108 connects the system bus 101 and an image bus 102 that transfers image data at a high speed. The image bus I/F is a bus bridge that converts the data structure.

The image bus 102 is a peripheral component interconnect (PCI) bus or a high speed bus such as an IEEE 1394 bus. A device I/F unit 110 connects the scanner 114 and the printer 113, which are image input and output devices, with the controller 100 and performs synchronous/asynchronous conversion of the image data.

A compression/decompression unit 109 compresses the image data and edge data described below according to a predetermined compression method.

An input image processing unit 112 corrects, processes, and edits the image data read by the scanner 114, and further performs processing appropriate for the subsequent processing, such as printing or image transmission.

A white paper determination processing unit 300 determines whether the image data input from the scanner 114 is the white paper. The processing performed by the white paper determination processing unit 300 will be described in detail below.

An output image processing unit 111 performs correction and resolution conversion on image data so that the image data can be appropriately printed by the printer 113.

The printer 113 outputs the image data on paper according to a predetermined printing method. There are various printing methods such as the electrophotographic printing method that fixes toner on paper using a photosensitive drum or a photosensitive member belt, and the ink jet printing method that directly prints an image on paper by discharging ink from a minute nozzle array. The printing method is not limited to a specific printing method in the present exemplary embodiment.

Figure 2:
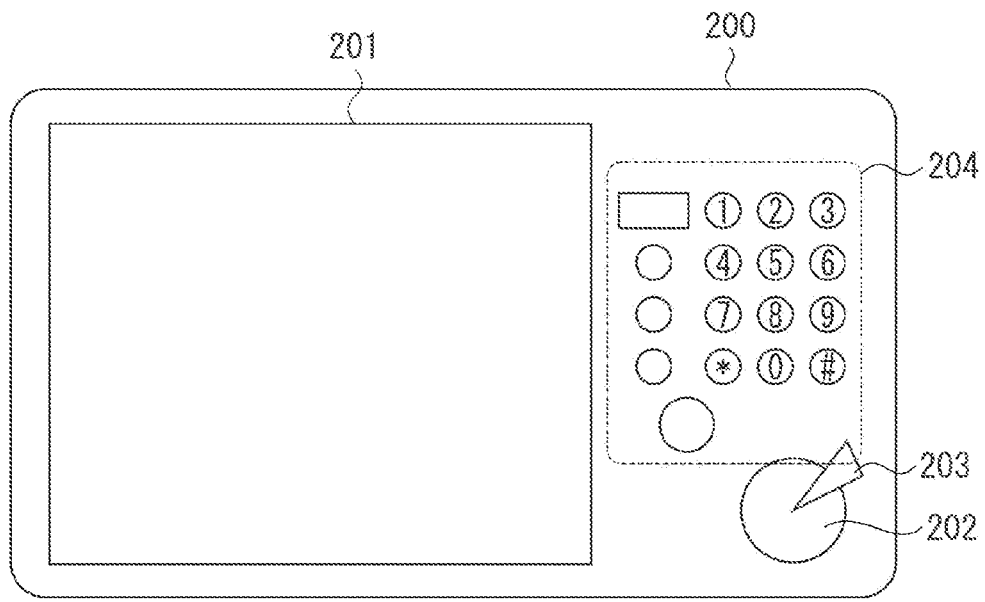
FIG. 2 is an external view of an operation unit of the multifunction peripheral.

Next, a configuration example of the operation unit 200 of the digital multifunction peripheral that realizes the present exemplary embodiment will be described with reference to FIG. 2. A liquid crystal operation panel 201, which is a display screen, includes a liquid crystal screen and a touch panel and displays contents of settings and softkeys. Various display examples according to the present exemplary embodiment will be described below.

A start key 202 is a hard key to input an instruction to start, for example, a copy operation. The start key 202 incorporates green and red light-emitting diodes (LEDs). If a green light is turned on, the selected operation can be started. If a red light is turned on, the selected operation cannot be started. A stop key 203 is a hard key used to stop the operation. A hard key group 204 includes a numeric keypad, a clear key, a reset key, a guide key, and a user mode key.

Figure 3:
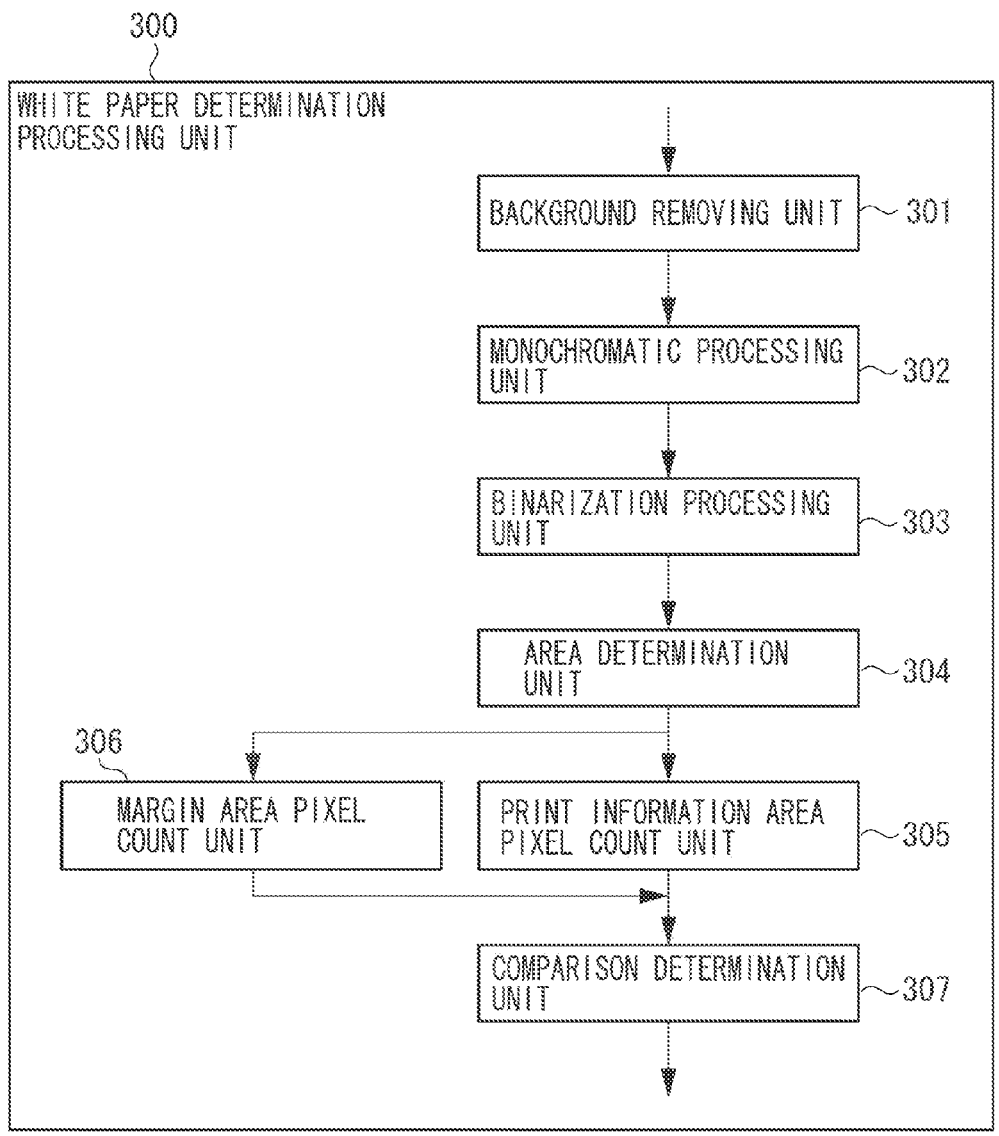
FIG. 3 is a block diagram of a white paper determination processing unit according to a first exemplary embodiment of the present invention.

Next, a configuration of the white paper determination processing unit 300 according to the first exemplary embodiment will be described with reference to FIG. 3.

A background removing unit 301 acquires a histogram of the image obtained by the scanner 114, detects a signal level of the background of the scanned document, removes the background from the image signal by subtracting the background level, and outputs the image after the removal of the background.

If the input image is a color image, a monochromatic processing unit 302 generates a monochromatic image using a conversion table, and outputs the generated image.

A binarization processing unit 303 performs simple binarization on the input monochromatic image by comparing a gradation value of the input monochrome image for each pixel with a predetermined threshold value, and then outputs the acquired binary image. In one embodiment, if the gradation value to be compared is 8 bits, the predetermined threshold value is in the range of 0 to 32. The threshold value is determined from this range based on the characteristics of the scanner device.

An area determination unit 304 determines whether a target pixel exists in either a print information area or a margin area. Processing of the area determination unit 304 will be described in detail below. According to the present exemplary embodiment, the print information area is where the print information exists in the image. Further, the margin area is the area other than the print information area in the image. The user can arbitrarily set the boundary coordinates of these areas via a margin setting screen 700 described below.

A print information area pixel count unit 305 counts the number of pixels which are included in the print information area and whose result of the binarization processing is 1, and outputs the count value. Processing of the print information area pixel count unit 305 will be described in detail below.

A margin area pixel count unit 306 counts the number of pixels which are included in the margin area and whose result of the binarization processing is 1, and outputs the count value. Processing of the margin area pixel count unit 306 will be described in detail below.

A comparison determination unit 307 perform calculation using the count value output by the print information area pixel count unit 305, the count value output by the margin area pixel count unit 306, an area of the print information area, and an area of the margin area. Then, the comparison determination unit 307 compares the calculation result with a predetermined threshold value, and outputs the result of the comparison. Processing of the comparison determination unit 307 will be described in detail below.

Next, examples of screen display of the operation unit 200 used for a setting each of the white paper detection functions according to the present exemplary embodiment will be described with reference to FIG. 4 to FIG. 8.

Figure 4:
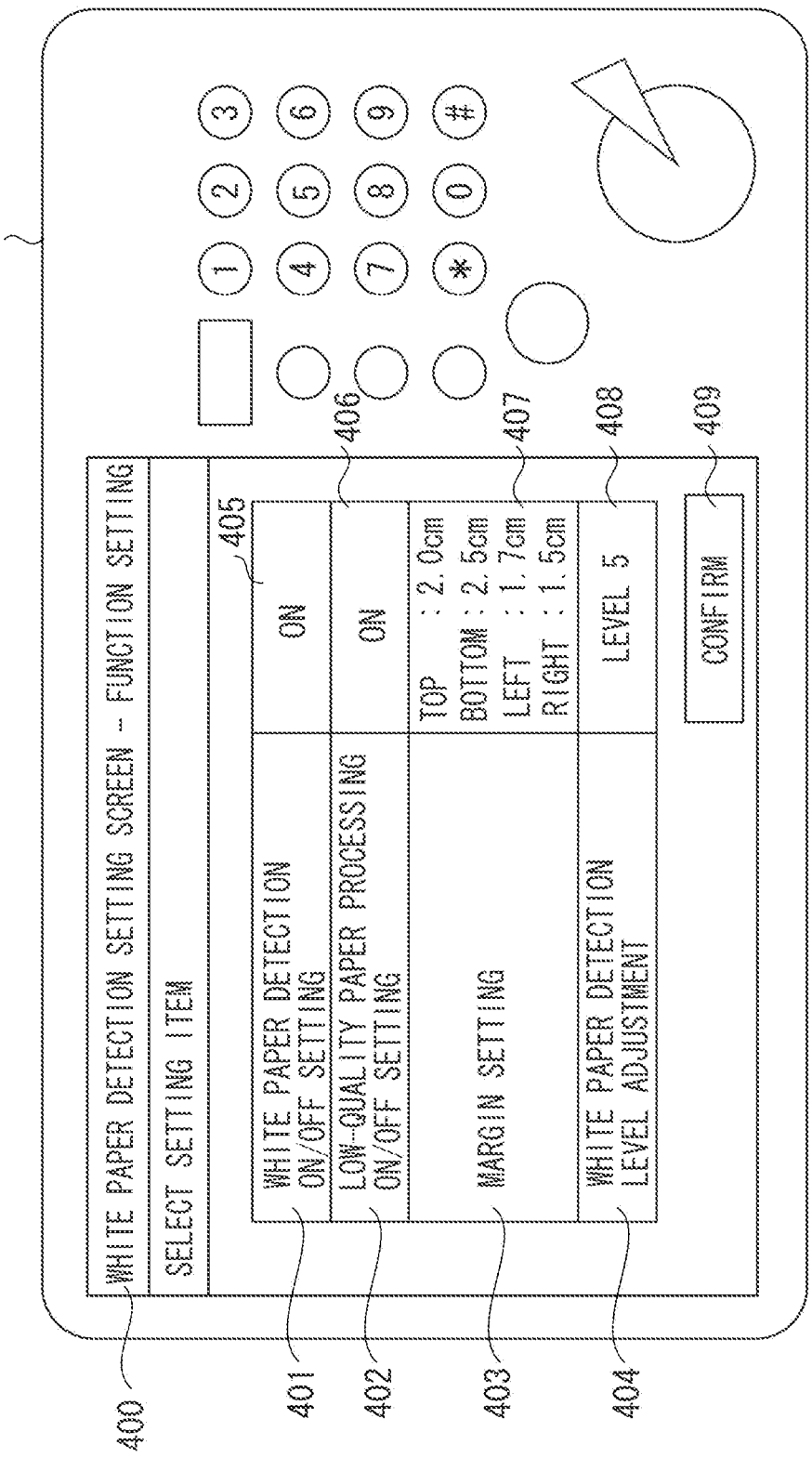
FIG. 4 is a display example of a white paper detection setting screen according to the first exemplary embodiment.

FIG. 4 illustrates a white paper detection setting screen 400 which is used for confirmation of the settings of each function related to the white paper detection and for changing to another setting screen.

If the user presses a white paper detection ON/OFF setting button 401, the screen display of the operation unit 200 is changed to a white paper detection ON/OFF setting screen 500. Further, the last setting state set by the user via the white paper detection ON/OFF setting screen 500 is displayed in a white paper detection ON/OFF setting state field 405.

If the user presses a low-quality paper processing ON/OFF setting button 402, the screen display of the operation unit 200 is changed to a low-quality paper processing ON/OFF setting screen 600. Further, the last setting state set by the user via the low-quality paper processing ON/OFF setting screen 600 is displayed in a low-quality paper processing ON/OFF setting state field 406.

If the user presses a margin setting button 403, the screen display of the operation unit 200 is changed to the margin setting screen 700. Further, the last setting values set by the user via the margin setting screen 700 are displayed in a margin setting state field 407.

If the user presses a white paper detection level adjustment button 404, the screen display of the operation unit 200 is changed to a white paper detection level adjustment screen 800. Further, the last setting value set by the user via the white paper detection level adjustment screen 800 is displayed in a white paper detection level adjustment state field 408.

If the user presses a confirm button 409, the screen of the operation unit 200 is changed to a home screen or to various setting screens.

Figure 5:
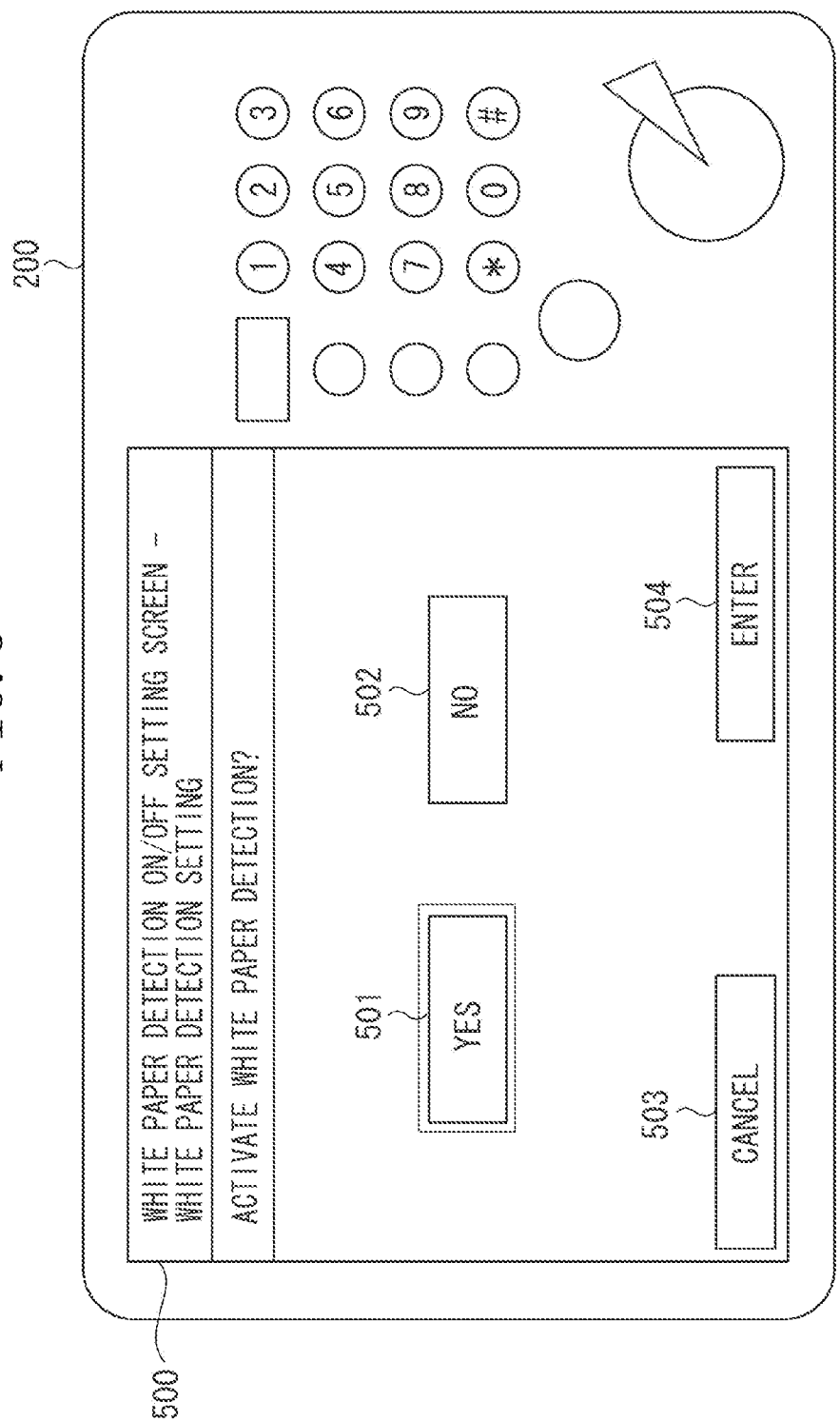
FIG. 5 is a display example of a white paper detection ON/OFF setting screen according to the first exemplary embodiment.

FIG. 5 illustrates the white paper detection ON/OFF setting screen 500 used for setting ON/OFF of the white paper detection function. A "YES" button 501, a "NO" button 502, a cancel button 503, and an enter button 504 are arranged on the screen.

The white paper detection function is activated if the user presses the enter button 504 immediately after pressing the "YES" button 501. On the other hand, if the user presses the cancel button 503 immediately after pressing the "YES" button 501, the last setting state will be maintained. Further, if the user presses the enter button 504 immediately after pressing the "NO" button 502, the state of the white paper detection function is turned OFF. On the other hand, if the user presses the cancel button 503 immediately after pressing the "NO" button 502, the last setting state will be maintained.

Figure 6:
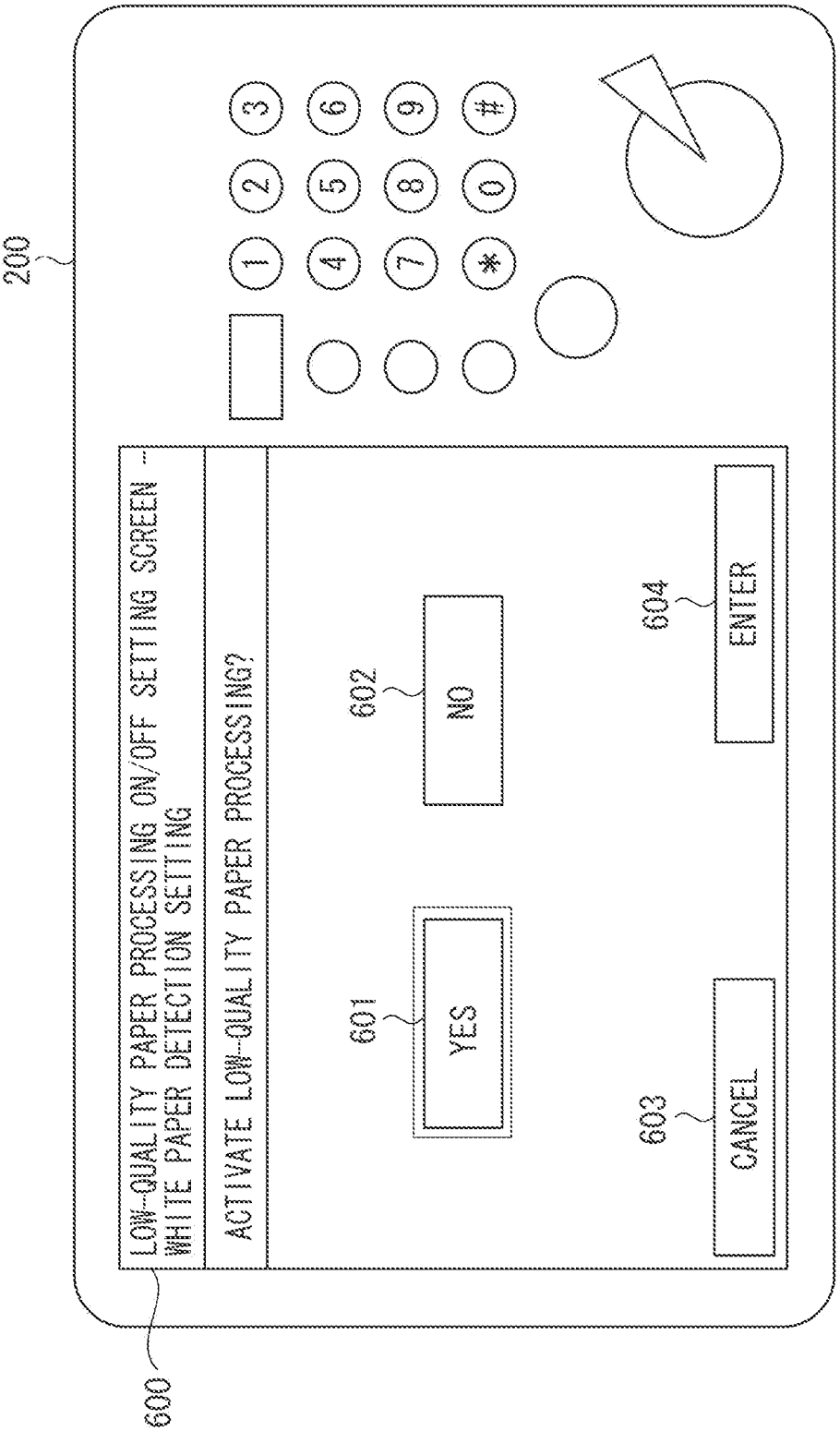
FIG. 6 is a display example of a low-quality paper processing ON/OFF setting screen according to the first exemplary embodiment.

FIG. 6 illustrates the low-quality paper processing ON/OFF setting screen 600 used for setting ON/OFF of the low-quality paper processing function. A "YES" button 601, a "NO" button 602, a cancel button 603, and an enter button 604 are arranged on the screen.

The low-quality paper processing function is activated if the user presses the enter button 604 immediately after pressing the "YES" button 601. On the other hand, if the user presses the cancel button 603 immediately after pressing the "YES" button 601, the last setting state will be maintained. Further, if the user presses the enter button 604 immediately after pressing the "NO" button 602, the state of the low-quality paper processing function is turned OFF. On the other hand, if the user presses the cancel button 603 immediately after pressing the "NO" button 602, the last setting state will be maintained.

Figure 7:
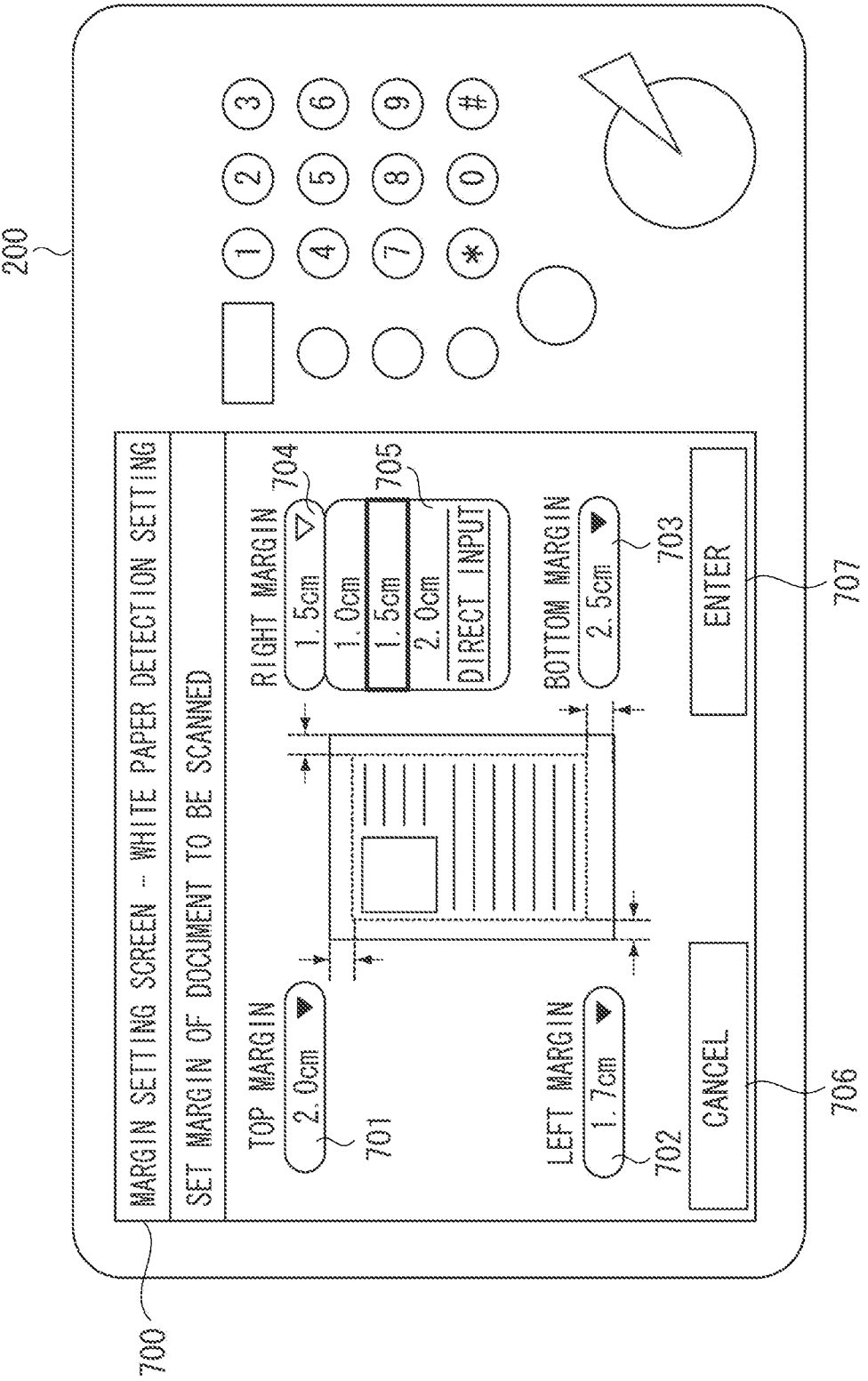
FIG. 7 is a display example of a margin setting screen according to the first exemplary embodiment.

FIG. 7 illustrates the margin setting screen 700 used for setting the margin area of the document to be read. On the screen, there are arranged a top margin setting button 701, a left margin setting button 702, a bottom margin setting button 703, a right margin setting button 704, a pull-down selector 705 which is displayed when each margin setting button is pressed, a cancel button 706, and an enter button 707.

The user inputs the margin setting value via the pull-down selector 705 which is displayed when one of the margin setting buttons is pressed. The user can select a predetermined value or directly input a value. If the user directly inputs a value, a limit is provided so that the value is set within an effective print area characteristic of the apparatus. If the user presses the enter button 707 after inputting a margin setting value, the margin setting value will be reflected to the internal settings. On the other hand, if the user presses the cancel button 706 after inputting a margin setting value, the last setting state will be maintained.

The user can set the margin area of the image data by using such a display screen. Area segmentation of the margin area and the print information area of the image data can be determined in advance by the user via such a screen. Further, the margin area and the print information area can be set not by the user but according to the effective print area set by the apparatus.

If a document of a different format (e.g., if the document includes A4 size sheets and A3 size sheets, and the print areas thereof are different) is to be read, the margin area can be automatically set according to the effective print area. Further, the margin area of all the formats can be set based on a format having the smallest margin area. Furthermore, the user can set the margin area for each format.

Figure 8:
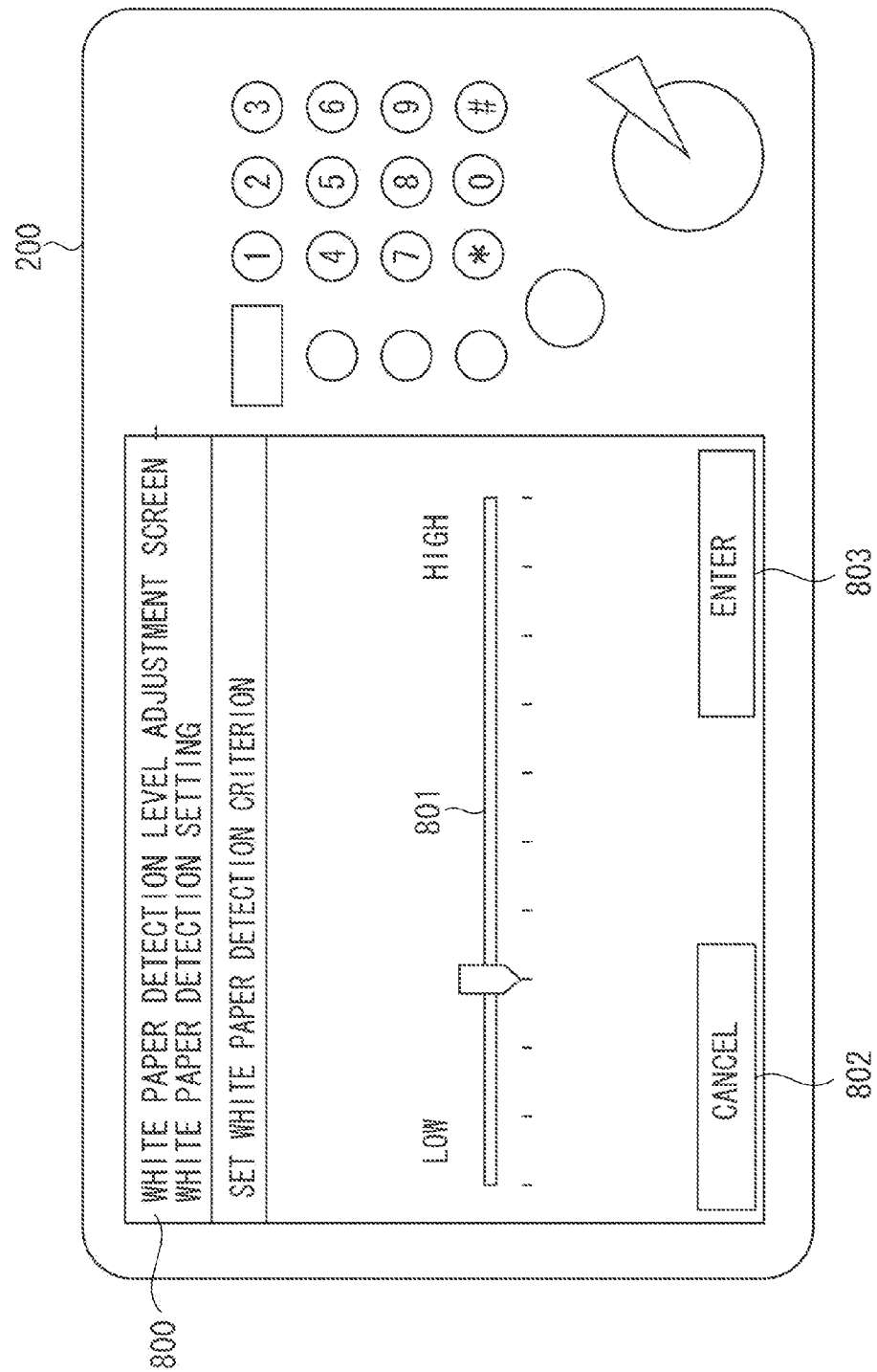
FIG. 8 is a display example of a white paper detection level adjustment screen according to the first exemplary embodiment.

FIG. 8 illustrates the white paper detection level adjustment screen 800 used for setting a threshold value level of the white paper determination. A white paper detection level adjustment bar 801, a cancel button 802, and an enter button 803 are arranged on the screen.

The user can change threshold values of the margin area pixel count unit 306 and the print information area pixel count unit 305 by moving the bar position of the white paper detection level adjustment bar 801. For example, if the user moves the bar position to "high", the threshold value of the white paper determination will be set to a high value. In other words, an amount of documents determined as white paper will be increased.

If the user presses the enter button 803 after changing the position of the level adjustment bar, the threshold value level after the change will be reflected to the internal settings. On the other hand, if the user presses the cancel button 802 after the position of the level adjustment bar is changed, the last setting state will be maintained. Further, the user can adjust the white paper detection level not by the adjustment bar but by directly setting the threshold value.

Next, boundary coordinates of the margin area and the print information area will be described with reference to FIG. 9. The boundary coordinates are referenced in the flowchart described below. A document 900 is image data generated when the document is read by the scanner 114. A left boundary coordinate 901 is a boundary coordinate between a left margin area and the print information area (which is hereinafter referred to as X_lb). A right boundary coordinate 902 is a boundary coordinate between a right margin area and the print information area (which is hereinafter referred to as X_rb).

An upper boundary coordinate 903 is a boundary coordinate between a top margin area and the print information area (which is hereinafter referred to as Y_tb). A lower boundary coordinate 904 is a boundary coordinate between a bottom margin area and the print information area (which is hereinafter referred to as Y_bb). The CPU 103 sets these boundary coordinates based on the size of the document read by the scanner 114 and the margin information set via the margin setting screen 700, to the area determination unit 304.

Next, a detailed processing flow of the area determination unit 304 according to the first exemplary embodiment will be described with reference to FIG. 10. A program code for realizing each step of the flowchart is stored in the storage unit 107 and executed by the CPU 103.

In step S1000, the area determination unit 304 extracts coordinates information (X, Y) of a target pixel. The area determination unit 304 is provided with counters configured to count the pixels in the main scanning direction and the sub-scanning direction, so that the area determination unit 304 can extract the coordinates information.

In step S1001, the area determination unit 304 determines whether the target pixel exists in the margin area or the print information area. As described above, X_lb, X_rb, Y_tb, and Y_bb are the boundary coordinates between the margin area and the print information area illustrated in FIG. 9. The determination is performed using these boundary coordinates, the coordinates information of the target pixel, and the following evaluation formula (1).

$$(X\_lb<X) \&\& (X<X\_rb) \&\& (Y\_tb<Y) \&\& (Y<Y\_bb) \quad (1)$$

If the result of the above-described evaluation formula is 1 (YES in step S1001), the area determination unit 304 determines that the target pixel exists in the print information area, and the processing proceeds to step S1002. In step S1002, the area determination unit 304 assigns 1 to an area flag "area_flag". On the other hand, if the result of the above-described evaluation formula is 0 (NO in step S1001), the area determination unit 304 determines that the target pixel exists in the margin area. The initial value 0 set to the area_flag is maintained, and the processing proceeds to step S1003. The generated area_flag is added to the image data as attribute information, and transmitted to the print information area pixel count unit 305 and the margin area pixel count unit 306 described below.

In step S1003, the area determination unit 304 determines whether the target pixel is the last pixel. Coordinates X_end and Y_end denote the coordinates of the last pixel and are set to the area determination unit 304 based on the size of the document read by the scanner 114 by the CPU 103. The area determination unit 304 makes the determination using the coordinates of the last pixel, the coordinates information of the target pixel, and the following evaluation formula (2).

$$(X,Y)==(X\_end,Y\_end) \quad (2)$$

If the result of the above-described evaluation formula is 1 (YES in step S1003), the area determination unit 304 determines that the target pixel is the last pixel, and the processing proceeds to step S1004. In step S1004, the area determination unit 304 assigns 1 to a last pixel flag "end_flag". On the other hand, if the result of the above-described evaluation formula is 0 (NO in step S1003), the area determination unit 304 determines that the target pixel is not the last pixel, and the initial value 0 of the end_flag is maintained. The generated end_flag is added to the image data as attribute information, and transmitted to the print information area pixel count unit 305 and the margin area pixel count unit 306 described below.

Figure 11:
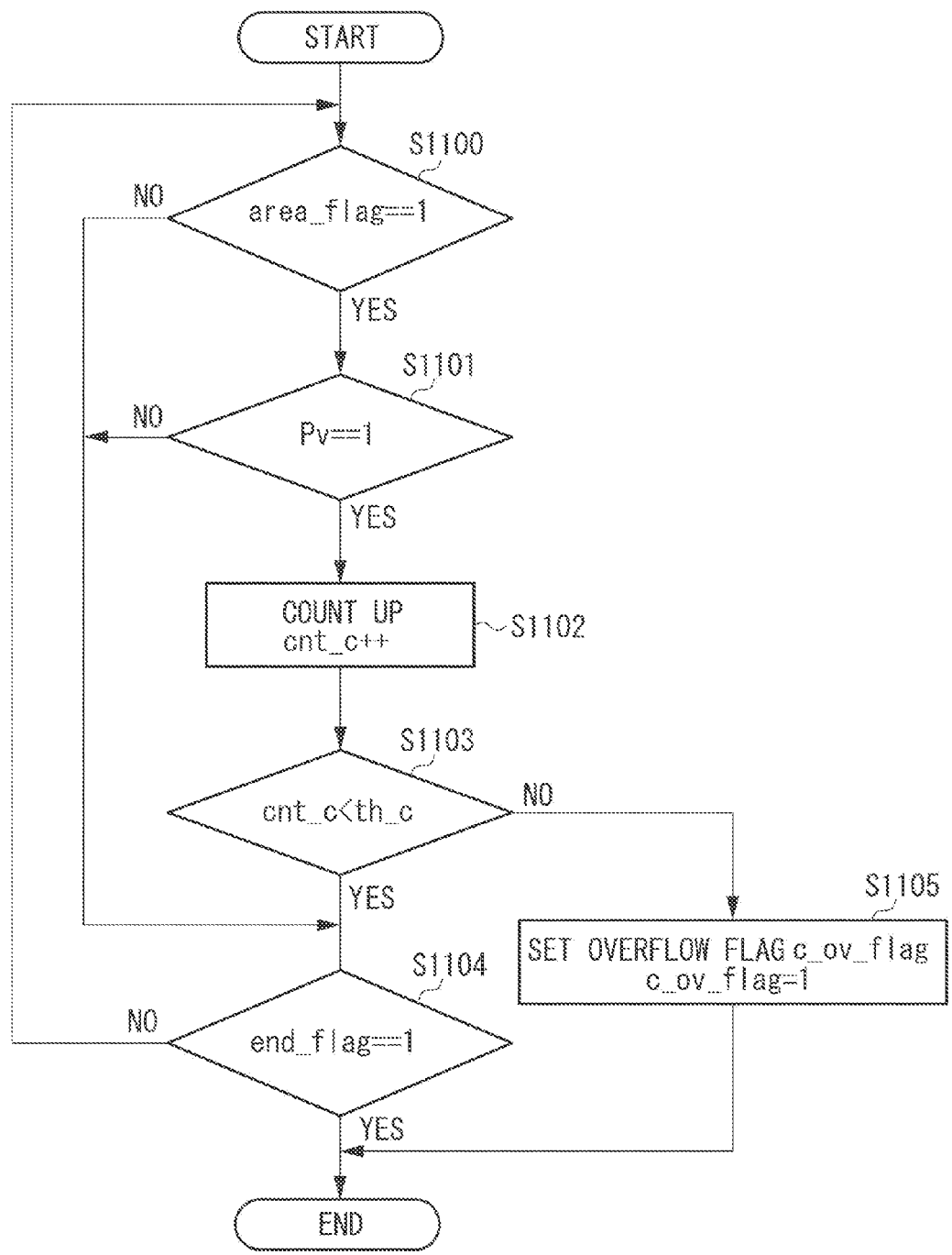
FIG. 11 is a flowchart illustrating processing of a print information area pixel count unit according to the first exemplary embodiment.

Next, detailed processing flow of the print information area pixel count unit 305 according to the present exemplary embodiment will be described with reference to FIG. 11. A program code for realizing each step of the flowchart is stored in the storage unit 107 and executed by the CPU 103.

If the document is determined that the number of the high gradation pixels (black pixels) are apparently large in the print information area by the processing illustrated in the flowchart, a flag indicating that the document is excluded from a processing target without performing the white paper determination processing is set thereto.

In step S1100, the print information area pixel count unit 305 determines whether a target pixel exists in the print information area.

Figure 10:
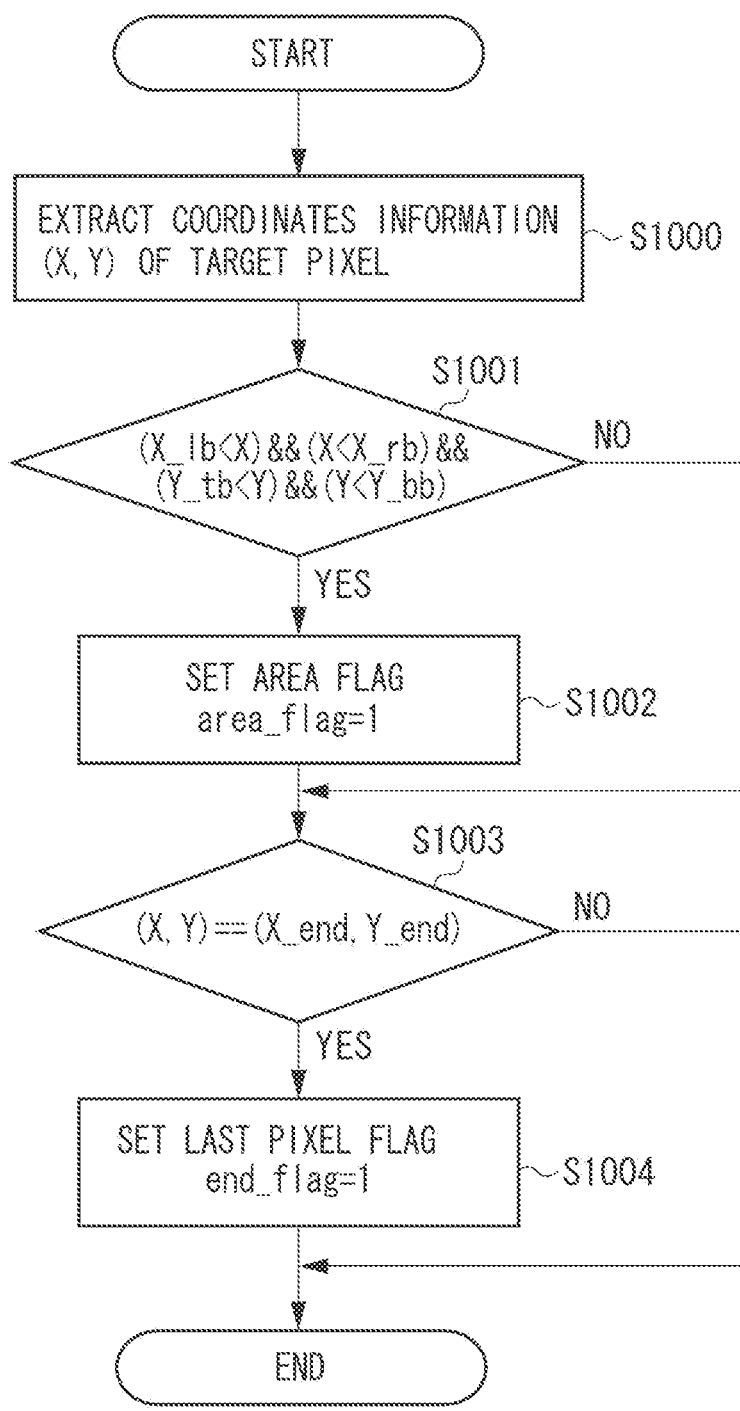
FIG. 10 is a flowchart illustrating processing of an area determination unit according to the first exemplary embodiment.

The determination is performed according to the area_flag added to the image data of the target pixel by the area determination unit 304 as illustrated in the flowchart in FIG. 10. In step S1100, if the area_flag is 0 (NO in step S1100), the print information area pixel count unit 305 determines that the target pixel does not exist in the print information area, and the processing proceeds to step S1104. Thus, the count processing of the target pixel will not be performed.

On the other hand, in step S1100, if the area_flag is 1 (YES in step S1100), the print information area pixel count unit 305 determines that the target pixel exists in the print information area, and the processing proceeds to step S1101. In step S1101, the print information area pixel count unit 305 performs the determination of a gradation value Pv of the target pixel.

In step S1101, if the print information area pixel count unit 305 determines that the gradation value Pv is 0, in other words, the above-described value binarized by the binarization processing unit 303 is 0 (i.e., not the black pixel) (NO in step S1101), the processing proceeds to step S1104. Thus, the count processing of the target pixel will not be performed. On the other hand, in step S1101, if the print information area pixel count unit 305 determines that the gradation value Pv is 1 (i.e., the black pixel) (YES in step S1101), the processing proceeds to step S1102. In step S1102, the print information area pixel count unit 305 increments a count value cnt_c.

In step S1103, the print information area pixel count unit 305 determines whether the count value cnt_c has reached an upper threshold value th_c. In one embodiment, the upper threshold value th_c is set to 1 to 20% of all the pixel numbers in the print information area. For example, regarding a 600 dpi A4 image, if the print information area is 85% of the whole area, the pixel number of the upper threshold value th_c will be in the range from 295800 to 5916595. The upper threshold value th_c that will be actually used from this range is determined based on the value set on the white paper detection level adjustment screen 800. For example, if the white paper detection level is set to the lowest level, the upper threshold value th_c will be 295800. If it is set to the highest level, the upper threshold value th_c will be 5916595.

If the print information area pixel count unit 305 determines that the count value cnt_c is greater than the upper threshold value th_c (NO in step S1103), the processing proceeds to step S1105. In step S1105, the print information area pixel count unit 305 determines that the count value cnt_c exceeds the upper limit threshold value, and assigns 1 to an overflow flag "c_ov_flag". The CPU 103 is notified of the generated c_ov_flag, and the CPU 103 performs setting on the comparison determination unit 307 based on the overflow flag c_ov_flag.

In step S1103, if the count value cnt_c is smaller than the upper threshold value th_c (YES in step S1103), the processing proceeds to step S1104. In step S1104, the print information area pixel count unit 305 determines whether the target pixel is the last pixel according to the end_flag added to the image data by the area determination unit 304. If 0 is set to the end_flag (NO in step S1104), the processing returns to step S1100, and the determination of the next target pixel is performed. If 1 is set to the end_flag (YES in step S1104), an integrated value of the count value cnt_c is transferred to the comparison determination unit 307, and then the processing ends.

In this manner, if the number of pixels (black pixels) having a high gradation value in the print information area is greater than a threshold value, since it is apparent that the processing target document is not white paper, the target document is determined that it is not white paper without the execution of the subsequent white paper determination processing.

Next, detailed processing flow of the margin area pixel count unit 306 according to the present exemplary embodiment will be described with reference to FIG. 12. A program code for realizing each step of the flowchart is stored in the storage unit 107 and executed by the CPU 103.

If the document is determined that the number of the high gradation pixels (black pixels) are apparently large in the margin area by the processing illustrated in the flowchart, there is a high possibility of an error in margin area designation. Therefore, a flag indicating that the document is excluded from a processing target without performing the white paper determination processing is set to the document.

In step S1200, the margin area pixel count unit 306 determines whether the target pixel exists in the margin area. The determination is performed according to the area_flag added to the image data of the target pixel by the area determination unit 304 as illustrated in the flowchart in FIG. 10. If the margin area pixel count unit 306 determines that the area_flag is 1 (NO in step S1200), it is determined that the target pixel does not exist in the margin area and the processing proceeds to step S1204. Thus, the count processing of the target pixel will not be performed. On the other hand, if the margin area pixel count unit 306 determines that the area_flag is 0 (YES in step S1200), the target pixel is determined that it exists in the margin area, and the processing proceeds to step S1201. In step S1201, the margin area pixel count unit 306 performs determination of the gradation value Pv of the target pixel.

In step S1201, if it is determined that the gradation value Pv is 0 (NO in step S1201), the processing proceeds to step S1204, and the count processing of the target pixel will not be performed. On the other hand, if it is determined that the gradation value Pv is 1 (YES in step S1201), the processing proceeds to step S1202. In step S1202, the margin area pixel count unit 306 increments a count value cnt_m.

In step S1203, the margin area pixel count unit 306 determines whether the count value cnt_m has reached an upper threshold value th_m. The upper threshold value th_m may be set to 1 to 20% of all the pixel numbers in the margin area. For example, regarding a 600 dpi A4 image, if the margin area is 15% of the whole area, the pixel number of the upper threshold value th_m will be in the range from 52200 to 1044105. The upper threshold value th_m that will be actually used from this range is determined based on the value set on the white paper detection level adjustment screen 800. For example, if the white paper detection level is set to the lowest level, the upper threshold value th_m will be 52200. If it is set to the highest level, the upper threshold value th_m will be 1044105.

In step S1203, if the margin area pixel count unit 306 determines that the count value cnt_m is greater than the upper threshold value th_m (NO in step S1203), the margin area pixel count unit 306 determines that the count value cnt_m exceeds the upper threshold value, and the processing proceeds to step S1205. In step S1205, the margin area pixel count unit 306 assigns 1 to an overflow flag m_ov_flag. The CPU 103 is notified of the generated m_ov_flag and the CPU 103 performs setting on the comparison determination unit 307 based on the m_ov_flag.

In step S1203, if the margin area pixel count unit 306 determines that the count value cnt_m is smaller than the upper threshold value th_m (YES in step S1203), the processing proceeds to step S1204. In step S1204, the margin area pixel count unit 306 determines whether the target pixel is the last pixel. The determination is made according to the end_flag added to the image data by the area determination unit 304.

In step S1204, if 0 is set to the end_flag (NO in step S1204), the processing returns to step S1200, and the determination of the next target pixel is performed. In step S1204, if 1 is set to the end_flag (YES in step S1204), an integrated value of the count value cnt_m is transferred to the comparison determination unit 307.

In this manner, if the number of pixels (black pixels) having a high gradation value in the margin area is greater than a threshold value, since it is apparent that the processing target document is not white paper, the target document is determined that it is not white paper without the execution of the subsequent white paper determination processing.

Next, an example of a case where the overflow flag c_ov_flag or m_ov_flag is set to 1 will be described with reference to FIGS. 13A to 13C. In the case of image data 1300 in FIG. 13A, since the count value cnt_c of the print information area reaches the upper threshold value th_c, the c_ov_flag will be set to 1. In the case of image data 1301 in FIG. 13B, since the count value cnt_m of the margin area reaches the upper threshold value th_m, the overflow flag m_ov_flag will be set to 1. In the case of image data 1302 in FIG. 13C, since both the counter of the print information area and the counter of the margin area reach the upper limit threshold values, the overflow flag c_ov_flag and the overflow flag m_ov_flag will be set to 1.

As described above, the counter of the print information area and/or the counter of the margin area of the image data illustrated in FIGS. 13A to 13C exceed the threshold values. If an image has such count values, there is a high possibility of the image being a document including print information, a document with an incorrect margin area setting, or a borderless document. Thus, such a document is forcibly treated as a normal document (document other than white paper).

Figure 14:
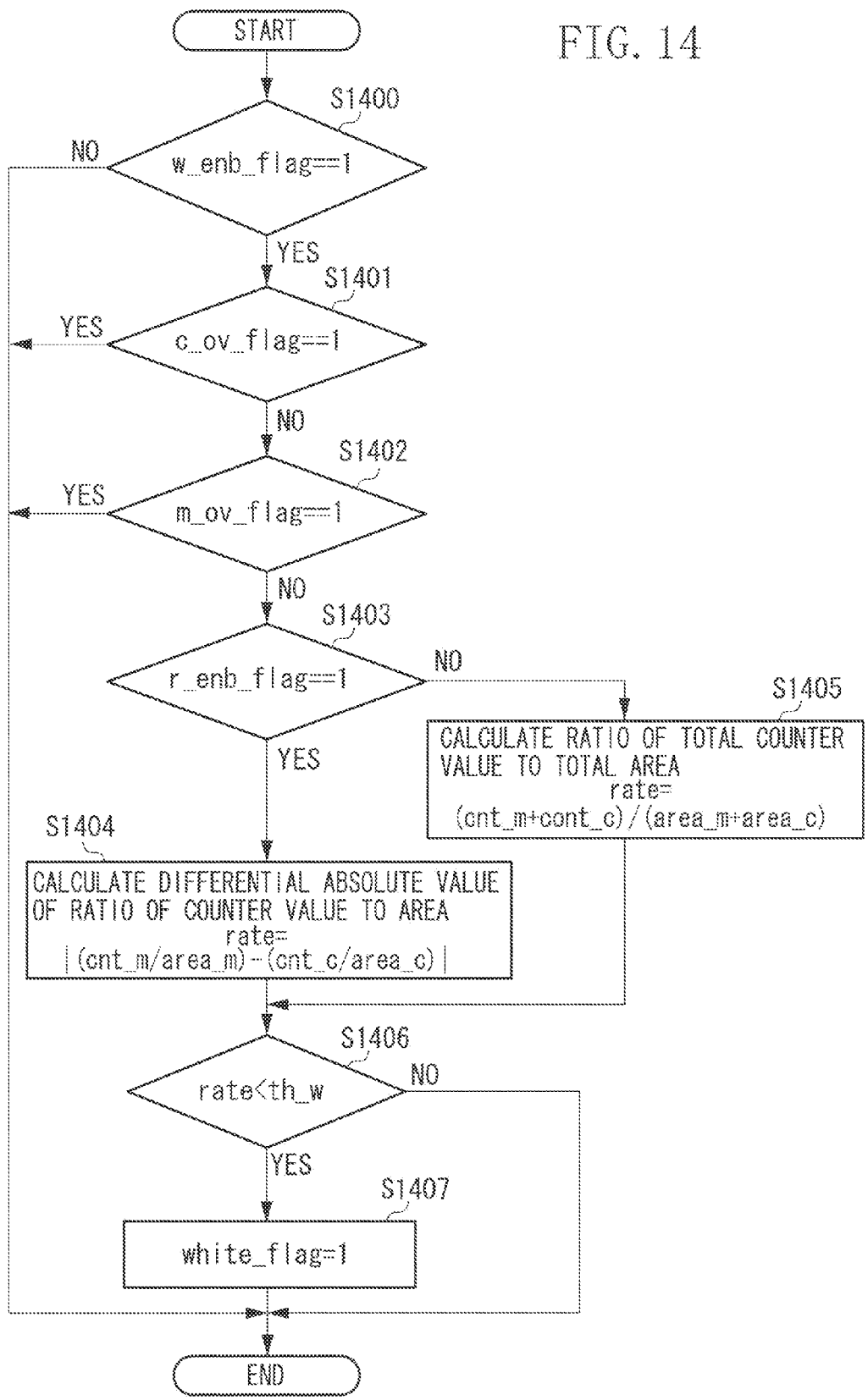
FIG. 14 is a flowchart illustrating processing of a comparison determination unit according to the first exemplary embodiment.

Next, detailed processing flow of the comparison determination unit 307 according to the present exemplary embodiment will be described with reference to FIG. 14. A program code for realizing each step of the flowchart is stored in the storage unit 107 and executed by the CPU 103.

In step S1400, the comparison determination unit 307 determines whether the white paper detection function is set to "ON". This is determined according to whether a white paper detection function valid flag (w_enb_flag) is 1. If the user activates the white paper detection function via the white paper detection ON/OFF setting screen 500, the CPU 103 sets the w_enb_flag to 1 for the comparison determination unit 307. In step S1400, if the w_enb_flag is 0 (NO in step S1400), a white paper flag (white_flag) is set to 0, and the CPU 103 is notified of the setting.

On the other hand, in step S1400, if the w_enb_flag is 1 (YES in step S1400), the processing proceeds to step S1401. In step S1401, the comparison determination unit 307 determines whether the count value cnt_c of the print information area pixel count unit 305 has reached the upper threshold value th_c. The determination is made based on the overflow flag c_ov_flag generated by the print information area pixel count unit 305. In step S1401, if the overflow flag c_ov_flag is 1 (YES in step S1401), the white paper flag (white_flag) is set to 0, and the CPU 103 is notified of the setting.

On the other hand, in step S1401, if the overflow flag c_ov_flag is 0 (NO in step S1401), the processing proceeds to step S1402. In step S1402, the comparison determination unit 307 determines whether the count value cnt_m of the margin area pixel count unit 306 has reached the upper threshold value th_m. The determination is made according to whether 1 is set to the overflow flag m_ov_flag generated by the margin area pixel count unit 306. In step S1402, if the overflow flag m_ov_flag is 1 (YES in step S1402), the white paper flag (white_flag) is set to 0, and the CPU 103 is notified of the setting.

On the other hand, in step S1402, if the overflow flag m_ov_flag is 0 (NO in step S1402), the processing proceeds to step S1403. According to the preceding steps, exceptional image data (image data forcibly treated as a normal document) such as the image data illustrated in FIGS. 13A to 13C is excluded from the processing target. In step S1403, the comparison determination unit 307 determines whether the low-quality paper processing function is "ON". This is determined according to whether a low-quality paper processing function valid flag r_enb_flag is 1. If the user activates the low-quality paper processing function via the low-quality paper processing ON/OFF setting screen 600, 1 is set to the low-quality paper processing function valid flag r_enb_flag.

In step S1403, if the low-quality paper processing function valid flag r_enb_flag is 1 (YES in step S1403), the processing proceeds to step S1404. In step S1404, the comparison determination unit 307 acquires a differential absolute value of the rate of the count value cnt_c to a print information area area_c and the rate of the count value cnt_m to a margin area area_m. A calculating formula (3) used in the acquisition is given below.

$$|(cnt\_m/area\_m)-(cnt\_c/area\_c)| \quad (3)$$

The CPU 103 sets the margin area area_m and the print information area area_c to the comparison determination unit 307 based on the size of the document read by the scanner 114 and the margin information set on the margin setting screen 700. (cnt_m/area_m) is the number of pixel of the count value cnt_m of a pixel whose result of the binarization processing in a unit area is 1 in the margin area. Similarly, (cnt_c/area_c) is the number of pixels of the count value cnt_c of a pixel whose result of the binarization processing in a unit area is 1 in the print area.

The value acquired according to the above-described calculating formula (3) is assigned to the rate of the calculation result.

On the other hand, in step S1403, if the low-quality paper processing function valid flag r_enb_flag is 0 (NO in step S1403), the processing proceeds to step S1405. In step S1405, the comparison determination unit 307 acquires a rate of a total value of the count value cnt_c and the count value cnt_m, to a total value of the print information area area_c and the margin area area_m. A calculating formula (4) used in the acquisition is given below.

$$(cnt\_m+cnt\_c)/(area\_m+area\_c) \quad (4)$$

The value obtained according to the above-described calculating formula is assigned to the rate of the calculation result.

In step S1406, the comparison determination unit 307 compares the rate acquired in step S1404 or S1405 to a threshold value th_w. The threshold value th_w in step S1406 is to be set in the range of 0.1 to 2%. The threshold value th_w that will be actually used from this range is determined based on the value set on the white paper detection level adjustment screen 800. For example, if the white paper detection level is set to the lowest level, the threshold value th_w will be 0.1%. If it is set to the highest level, the threshold value th_w will be 2%.

As a result of the comparison, if the acquired rate is smaller than the threshold value th_w (YES in step S1406), the processing proceeds to step S1407. In step S1407, the comparison determination unit 307 sets the white paper flag white_flag to 1, and the CPU 103 is notified of the setting. On the other hand, if the acquired rate is greater than the threshold value (NO in step S1406), the initial value 0 of the white_flag is maintained.

According to the above-described processing, the document that corresponds to the image data whose white_flag is set to 1 is determined as the white paper.

The document determined as the white paper is controlled so as not to be copied, not to be stored in the memory after reading, and not to be transmitted by facsimile transmission. In this manner, unnecessary use of print paper and memory can be reduced.

As described above, according to the present exemplary embodiment, image data obtained by reading a document is binarized, and then the binarized image data is divided into data of a margin area and data of a print information area. After then, the binarized data of each area is counted and a differential absolute value of the rate of the count result of each area to the area is calculated. Then, the calculation result and the threshold value are compared.

In this manner, influence of smudges or foreign substances uniformly distributed over the image data can be removed before the comparison with the threshold value. Accordingly, high accuracy white paper detection can be performed even if low-quality paper with foreign substances scattered over the entire document is used. Further, even if the density of the smudges or the foreign substances is different for each page, since the above-described calculation is performed for each page, high accuracy white paper detection can be performed.

Next, a second exemplary embodiment of the present invention will be described with reference to drawings.

Figure 19:
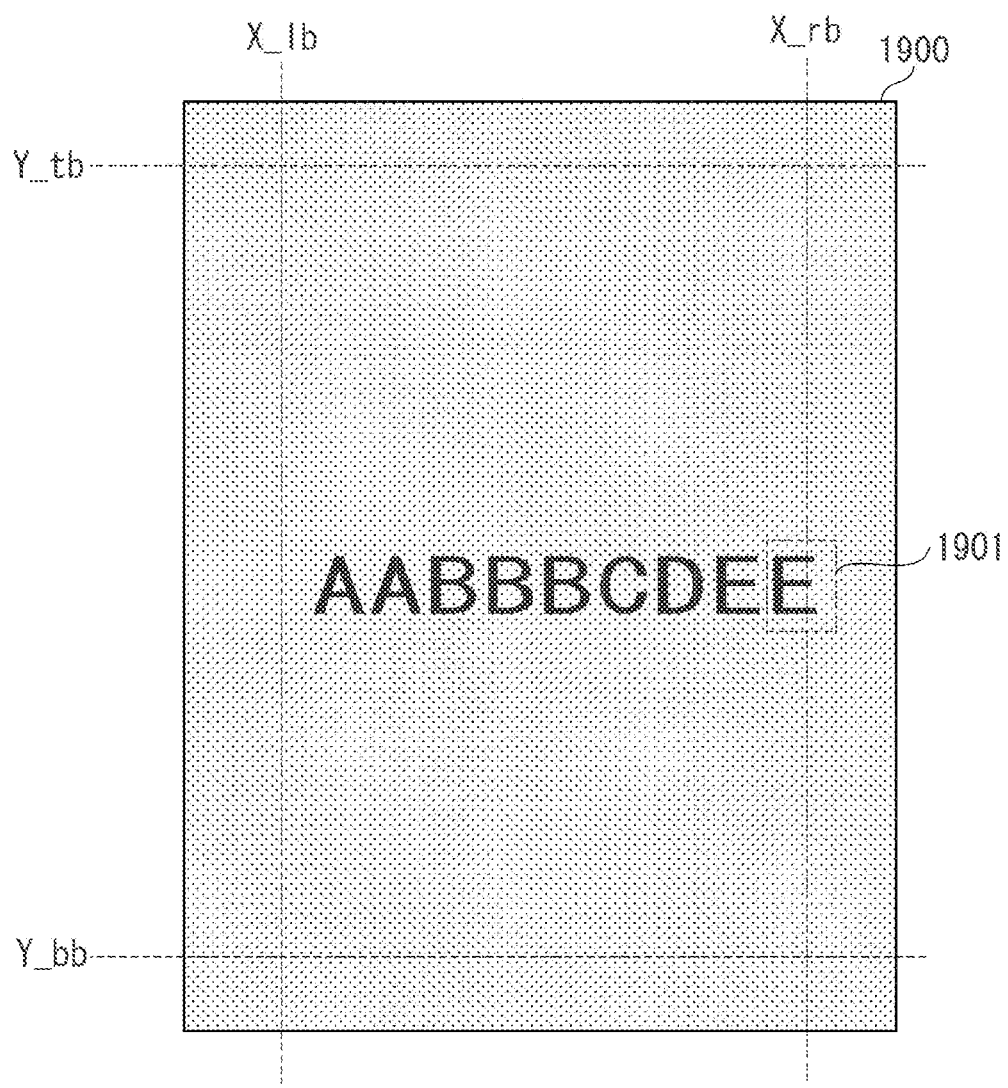
FIG. 19 illustrates an example of a document to which the second exemplary embodiment is applied.

According to the present exemplary embodiment, for example, if characters continuously exist in the print information area and the margin area as illustrated in FIG. 19, the pixel which exists in the margin area and whose result of the binarization processing is 1 is not included in the count value. In this manner, white paper detection that can cope with an error related to setting of the margin area or a character that extends off the print information area to the margin area can be performed. According to the present exemplary embodiment, since the configuration example of the image processing control system and the configuration example of the operation unit 200 are similar to those of the first exemplary embodiment, their descriptions are not repeated.

Figure 15:
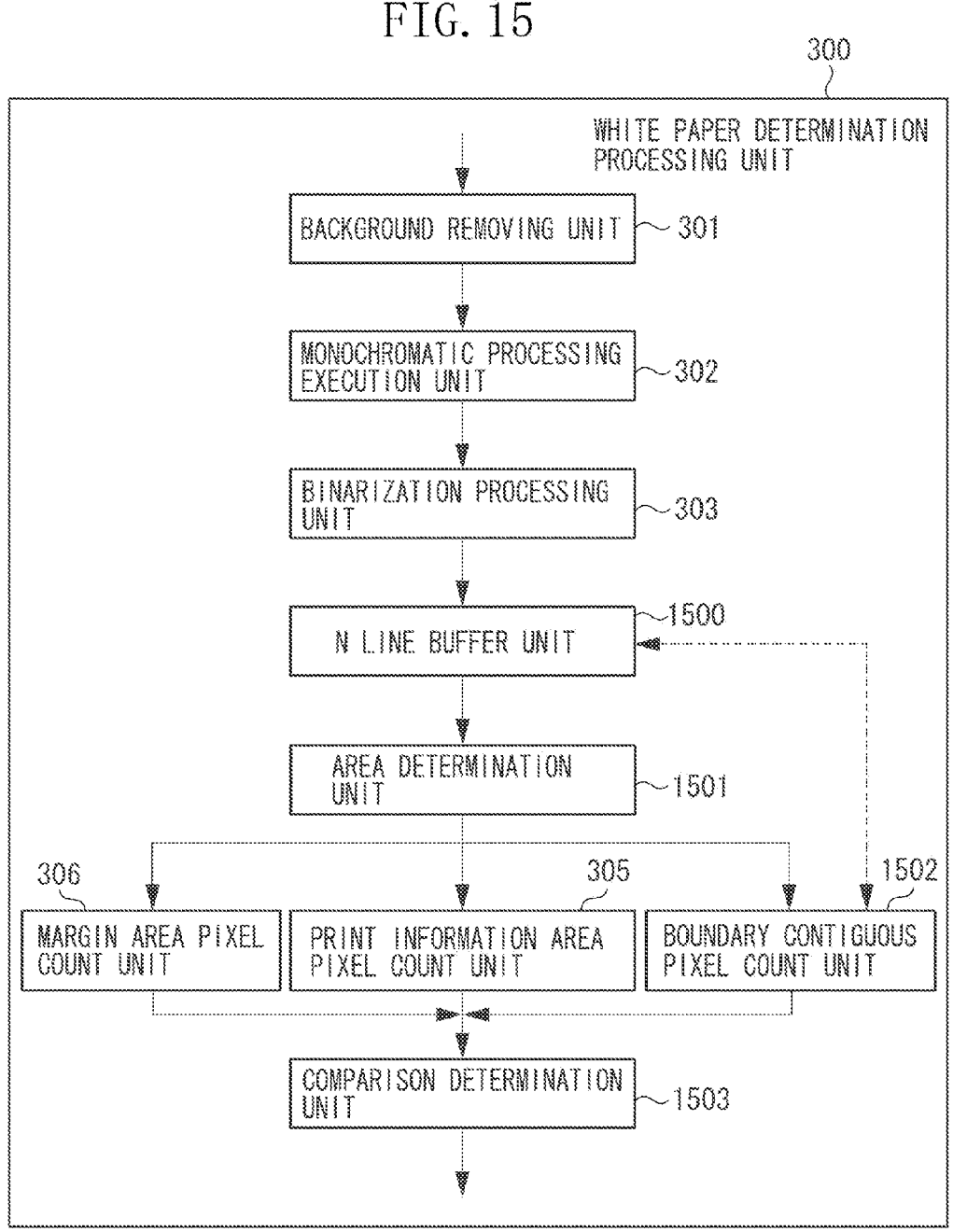
FIG. 15 is a block diagram illustrating the white paper determination processing unit according to a second exemplary embodiment of the present invention.

FIG. 15 illustrates a configuration of a white paper determination processing unit 300 according to the second exemplary embodiment. Since the background removing unit 301, the monochromatic processing unit 302, the binarization processing unit 303, the print information area pixel count unit 305, and the margin area pixel count unit 306 are similar to the units described according to the first exemplary embodiment, their descriptions are not repeated.

An N line buffer unit 1500 stores image data of N lines in the sub-scanning direction in a memory such as a static random access memory (SRAM). The number N may be an odd number. The N line buffer unit 1500 stores the image data of a first line to a (N−1)/2-th line of the image data, which is input in the N line buffer unit 1500, in the memory. The image data is not output to the subsequent stage.

When the image data input in the N line buffer unit 1500 reaches an (N+1)/2-th line, the data of the first line stored in the memory is sequentially output to the subsequent stage. Even if the data is output, content of the data of the first line stored in the memory is maintained in the memory. When the image data input in the N line buffer unit 1500 reaches an (N+1)-th line, the area where the image data of the first line is stored is overwritten with the image data input in the N line buffer unit 1500.

Figure 9:
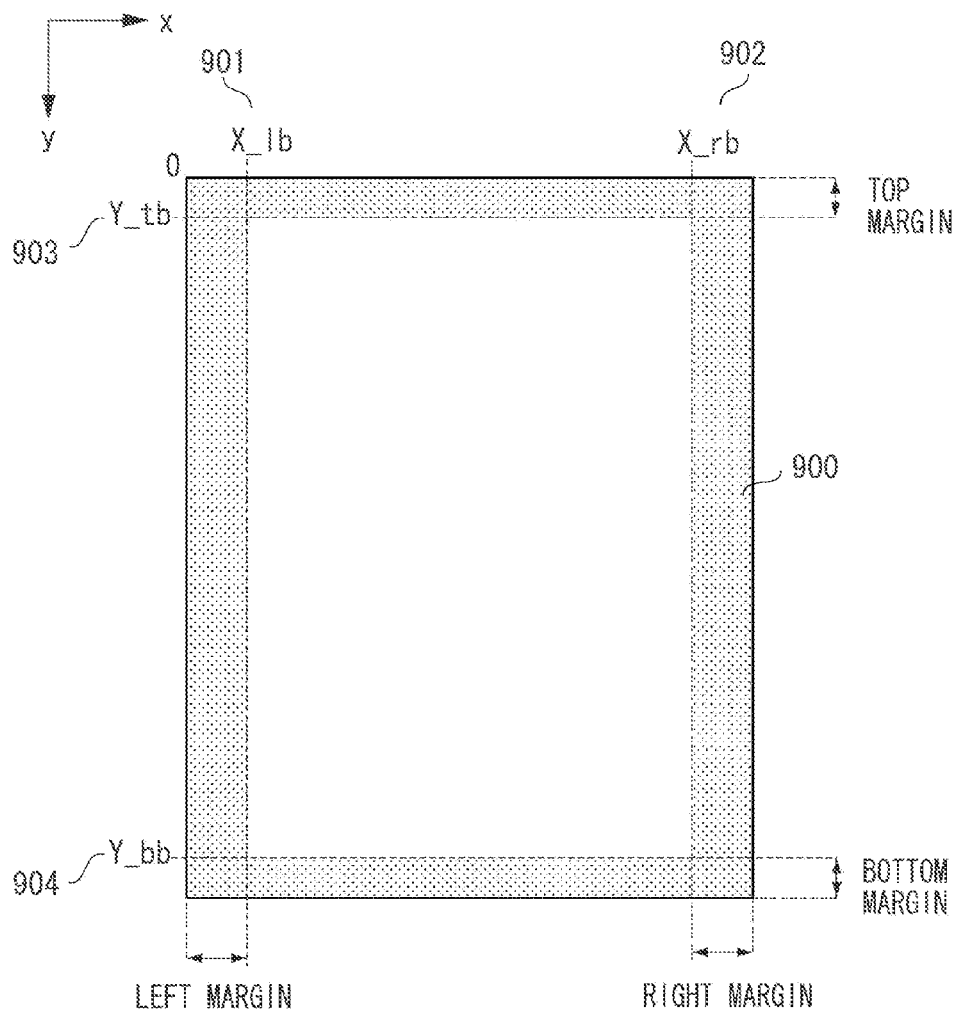
FIG. 9 is a conceptual drawing of boundary coordinates.

An area determination unit 1501 determines whether the target pixel exists in the print information area or in the margin area, and further, determines whether the target pixel is in the vicinity of the boundary coordinates $X\_lb$, $X\_rb$, $Y\_tb$, and $Y\_bb$ illustrated in FIG. 9. Processing of the area determination unit 1501 will be described in detail below.

A consecutive pixels count unit 1502 determines whether pixels whose result of the binarization processing is 1 continues from a target pixel which exists in the margin area and whose result of the binarization processing is 1 to a pixel in the print information area in the vicinity of the boundary coordinates $X\_lb$, $X\_rb$, $Y\_tb$, and $Y\_bb$. As a result of the determination, the consecutive pixels count unit 1502 counts the number of the target pixel, which is determined to be continued to the print information area, and outputs the count value. Processing of the consecutive pixels count unit 1502 will be described in detail below.

A comparison determination unit 1503 performs calculation using count values output from each of the print information area pixel count unit 305, the margin area pixel count unit 306, and the consecutive pixels count unit 1502, the area of the print information area, and the area of the margin area. Then, the comparison determination unit 1503 compares the calculation result and a predetermined threshold value, and outputs the result of the comparison. Processing of the comparison determination unit 1503 will be described in detail below.

Figure 16:
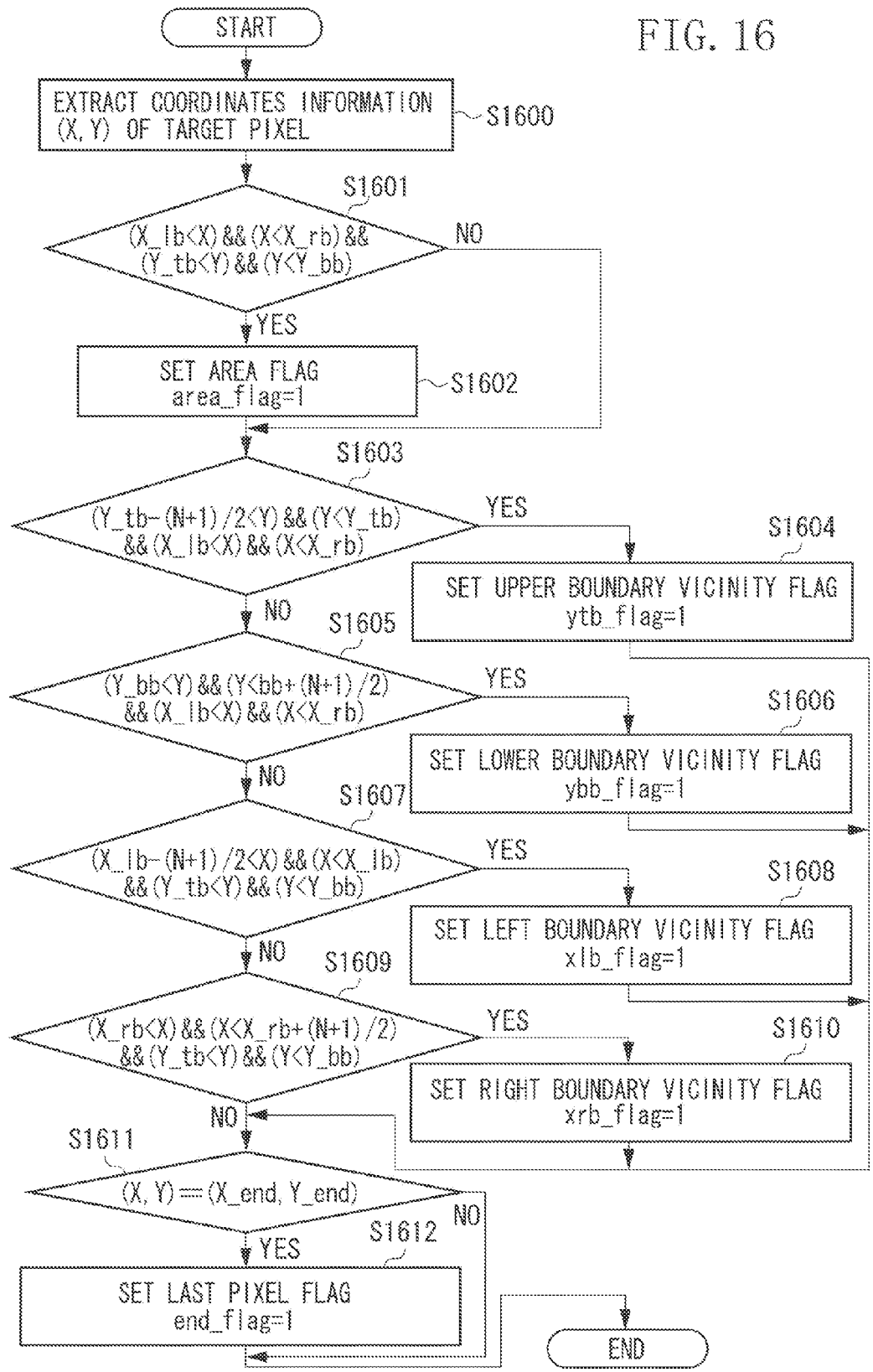
FIG. 16 is a flowchart illustrating processing of an area determination unit according to the second exemplary embodiment.

Next, detailed processing of the area determination unit 1501 according to the second exemplary embodiment will be described with reference to FIG. 16. A program code for realizing each step of the flowchart is stored in the storage unit 107 and executed by the CPU 103.

In step S1600, the area determination unit 1501 extracts coordinates information (X, Y) of a target pixel. The area determination unit 1501 is provided with counters configured to count the pixels in the main scanning direction and the sub-scanning direction, so that the area determination unit 1501 can extract the coordinates information.

In step S1601, the area determination unit 1501 determines whether the target pixel exists in the margin area or the print information area. As described above, $X\_lb$, $X\_rb$, $Y\_tb$, and $Y\_bb$ are the boundary coordinates between the margin area and the print information area illustrated in FIG. 9. The determination is performed using these boundary coordinates, the coordinates information of the target pixel, and the following evaluation formula (5).

$$(X\_lb<X)\&\&(X<X\_rb)\&\&(Y\_tb<Y)\&\&(Y<Y\_bb) \quad (5)$$

If the result of the above-described evaluation formula (5) is 1 (YES in step S1601), the processing proceeds to step S1602. In step S1602, the area determination unit 1501 determines that the target pixel exists in the print information area, and assigns 1 to the area flag "area_flag". On the other hand, if the result of the above-described evaluation formula (5) is 0 (NO in step S1601), the area determination unit 1501 determines that the target pixel exists in the margin area, and the initial value 0 set to the area_flag is maintained, and the processing proceeds to step S1603. The generated area_flag is added to the image data as attribute information, and transmitted to the print information area pixel count unit 305, the margin area pixel count unit 306, and the consecutive pixels count unit 1502 described below.

In step S1603, the area determination unit 1501 determines whether the target pixel is in the vicinity of the upper boundary coordinates. The determination is made using the line number N in the N line buffer unit 1500, the boundary coordinates, and the coordinates information of the target pixel, and according to the following evaluation formula (6).

$$(Y\_tb-(N+1)/2<Y)\&\&(Y<Y\_tb)\&\&(X\_lb<X)\&\& (X<X\_rb) \quad (6)$$

Figure 21A:
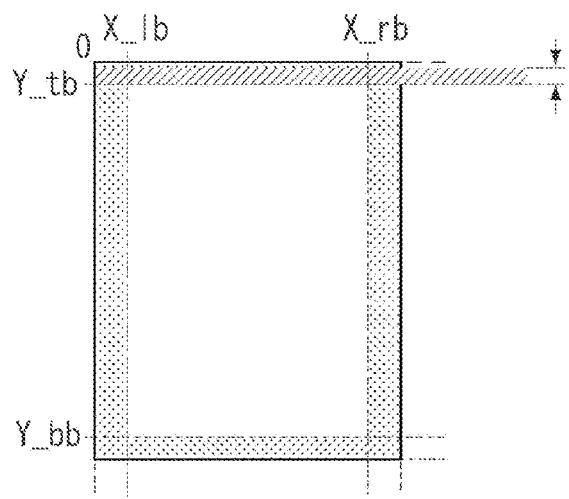
FIG. 21A illustrates a coordinates range of pixels that exist in the margin area stored in a line buffer.
Figure 21B:
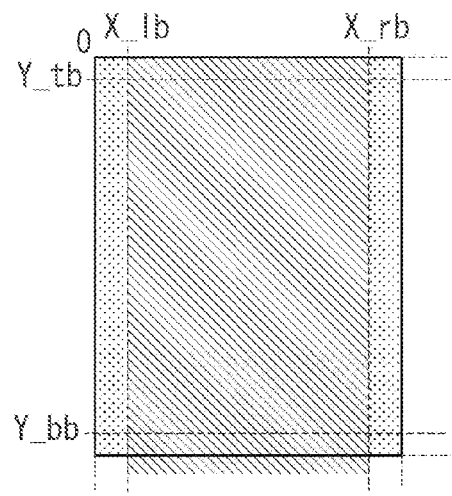
FIG. 21B illustrates a range represented by (X_lb<X)&&(X<X_rb).
Figure 21C:
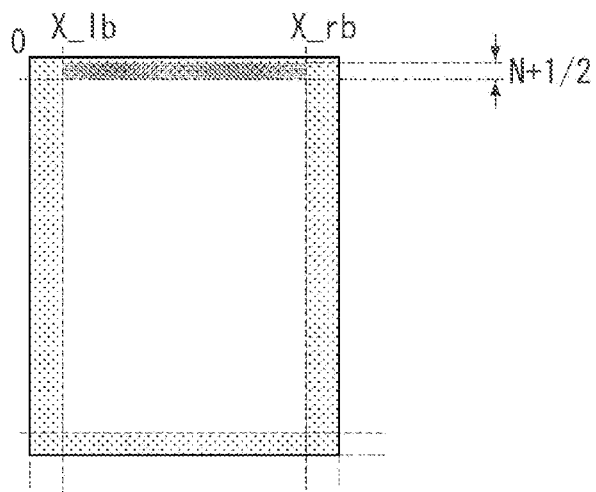
FIG. 21C illustrates a range included in upper boundary coordinates vicinity.

$(Y\_tb-(N+1)/2<Y)\&\&(Y<Y\_tb)$ in the evaluation formula (6) denotes the coordinates of the pixels that exist in the margin area stored in the line buffer unit when the target pixel is at the upper boundary coordinate $Y\_tb$. The range expressed by this evaluation formula is the shaded area illustrated in FIG. 21A. Further, the area denoted by $(X\_lb<X)\&\&(X<X\_rb)$ is the shaded area illustrated in FIG. 21B. Thus, the range expressed by the evaluation formula (6) is the shaded area illustrated in FIG. 21C.

If the result of the above-described evaluation formula is 1 (YES in step S1603), the processing proceeds to step S1604. In step S1604, the area determination unit 1501 determines that the target pixel is in the vicinity of the upper boundary coordinates, and assigns 1 to an upper boundary vicinity flag ytb_flag.

On the other hand, if the result of the above-described evaluation formula is 0 (NO in step S1603), the processing proceeds to step S1605. In step S1605, the area determination unit 1501 determines whether the target pixel is in the vicinity of the lower boundary coordinates. The determination is made using the line number N in the N line buffer unit 1500, the boundary coordinates, and the coordinates information of the target pixel, and according to the following evaluation formula (7).

$$(Y\_bb<Y) \&\& (Y<Y\_bb+(N+1)/2) \&\& (X\_lb<X) \&\& (X<X\_rb) \qquad (7)$$

If the result of the above-described evaluation formula is 1 (YES in step S1605), the area determination unit 1501 determines that the target pixel exists in the vicinity of the lower boundary coordinates, and the processing proceeds to step S1606. In step S1606, the area determination unit 1501 assigns 1 to a lower boundary vicinity flag ybb_flag.

On the other hand, if the result of the above-described evaluation formula is 0 (NO in step S1605), the processing proceeds to step S1607. In step S1607, the area determination unit 1501 determines whether the target pixel is in the vicinity of the left boundary coordinates. The determination is made using the line number N in the N line buffer unit 1500, the boundary coordinates, the coordinates information of the target pixel, and according to the following evaluation formula (8).

$$(X\_lb-(N+1)/2<X) \&\& (X<X\_lb) \&\& (Y\_tb<Y) \&\& (Y<Y\_bb) \qquad (8)$$

If the result of the above-described evaluation formula is 1 (YES in step S1607), the area determination unit 1501 determines that the target pixel exists in the vicinity of the left boundary coordinates, and the processing proceeds to step S1608. In step S1608, the area determination unit 1501 assigns 1 to a left boundary vicinity flag xlb_flag.

On the other hand, if the result of the above-described evaluation formula is 0 (NO in step S1607), the processing proceeds to step S1609. In step S1609, the area determination unit 1501 determines whether the target pixel is in the vicinity of the right boundary coordinates. The determination is made using the line number N in the N line buffer unit 1500, the boundary coordinates, and the coordinates information of the target pixel, and according to the following evaluation formula (9).

$$(X\_rb<X) \&\& (X<X\_rb+(N+1)/2) \&\& (Y\_tb<Y) \&\& (Y<Y\_bb) \qquad (9)$$

If the result of the above-described evaluation formula is 1 (YES in step S1609), the area determination unit 1501 determines that the target pixel exists in the vicinity of the right boundary coordinates, and the processing proceeds to step S1610. In step S1610, the area determination unit 1501 assigns 1 to a right boundary vicinity flag xrb_flag.

If the result of the above-described evaluation formula is 0 (NO in step S1609), then in step S1611, the area determination unit 1501 determines whether the target pixel is the last pixel. Coordinates X_end and Y_end denote the coordinates of the last pixel and are set to the area determination unit 1501 by the CPU 103 based on the size of the document read by the scanner 114. The area determination unit 1501 makes the determination according to the coordinates of the last pixel, the coordinates information of the target pixel, and the following evaluation formula (10).

$$(X, Y)==(X\_end, Y\_end) \qquad (10)$$

If the result of the above-described evaluation formula is 1 (YES in step S1611), the target pixel is determined as the last pixel, and the processing proceeds to step S1612. In step S1612, the area determination unit 1501 assigns 1 to the last pixel flag end_flag. On the other hand, if the result of the above-described evaluation formula is 0 (NO in step S1611), the target pixel is not determined as the last pixel, and the initial value 0 of the last pixel flag end_flag is maintained. The generated end_flag is added to the image data as attribute information, and transmitted to the print information area pixel count unit 305, the margin area pixel count unit 306, and the consecutive pixels count unit 1502 described below.

Next, detailed processing of the consecutive pixels count unit 1502 according to the second exemplary embodiment will be described with reference to FIG. 17. A program code for realizing each step of the flowchart is stored in the storage unit 107 and executed by the CPU 103.

Figure 17:
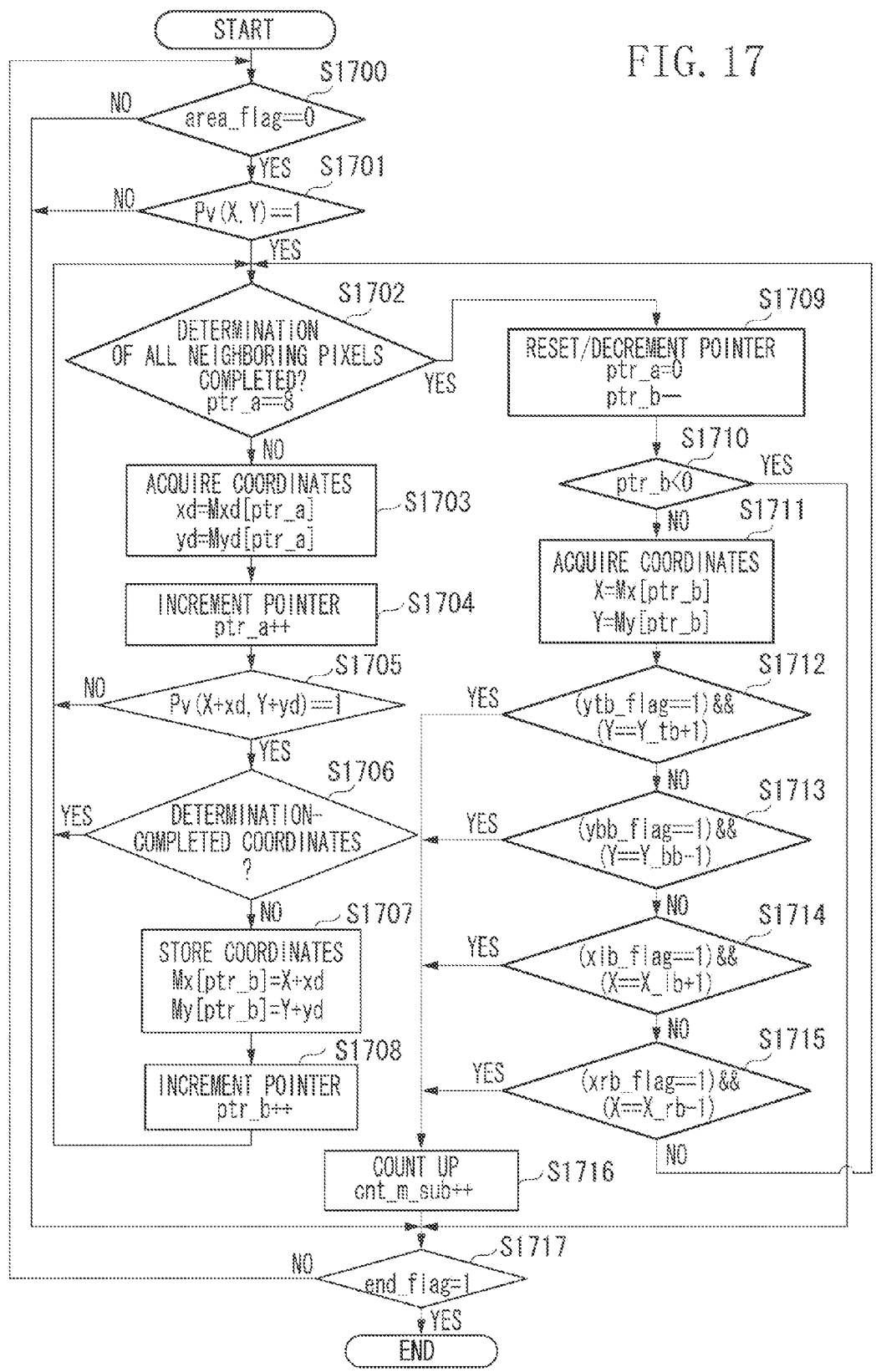
FIG. 17 is a flowchart illustrating processing of a consecutive pixels count unit according to the second exemplary embodiment.
Figure 20:
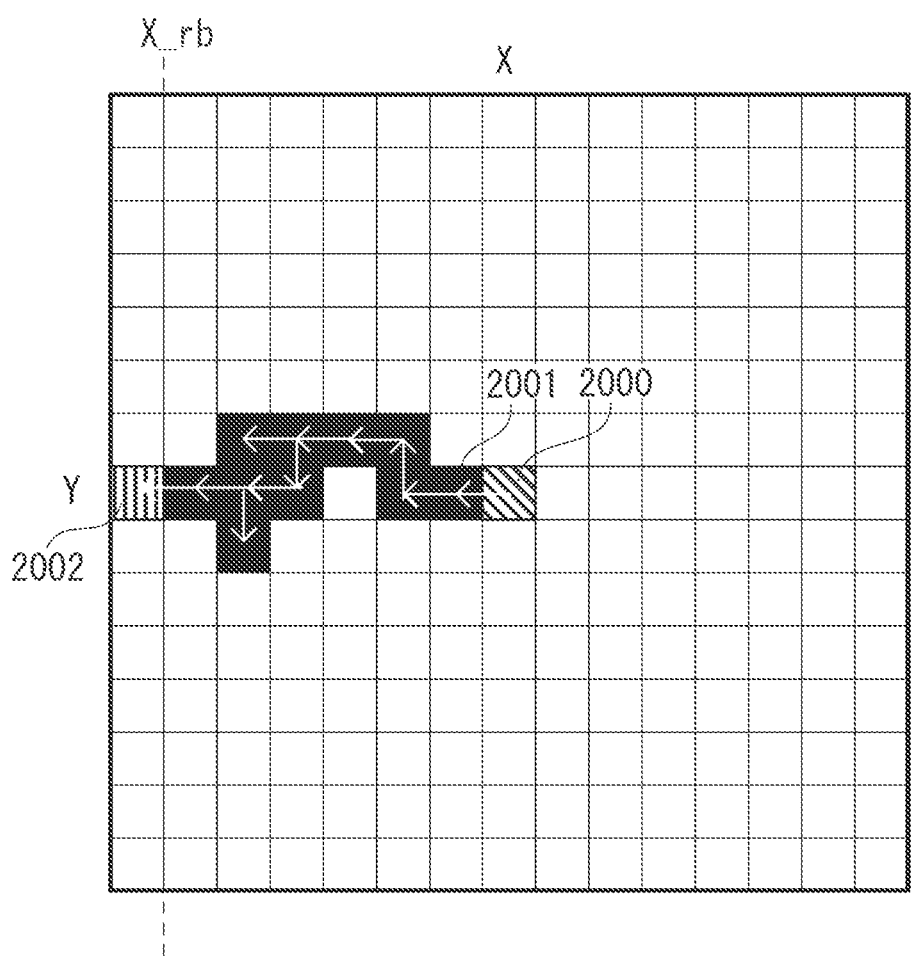
FIG. 20 illustrates a flow to detect a coordinate position of pixels which continue to a content area.

Further, the flow of the processing in FIG. 17 is described with reference to a specific example illustrated in FIG. 20. In FIG. 20, a target pixel 2000 is the first target pixel. The target pixel 2000 exists in the margin area on the right side of the print information area. FIG. 20 illustrates a case where pixels whose result of the binarization processing is 1 contiguously exist across from the margin area on the right side to the print information area.

The processing illustrated in FIG. 17 is executed for the detection of the pixels that exist across from the margin area to the print information area as illustrated in FIG. 20, and whose result of the binarization processing is 1.

In step S1700, the consecutive pixels count unit 1502 causes the area determination unit 1501 to determine whether the target pixel exists in the margin area. The area determination unit 1501 makes the determination by referring to the area_flag added to the image data. In step S1700, if the area_flag is 1 (NO in step S1700), it is determined that the target pixel does not exist in the margin area, and the count processing of the target pixel is not performed. On the other hand, in step S1700, if the area_flag is 0 (YES in step S1700), it is determined that the target pixel exists in the margin area. Then, the processing proceeds to step S1701 and determination of the gradation values of Pv(X, Y) of the target pixel is performed.

In step S1701, if the gradation value Pv(X, Y) is 0 (NO in step S1701), the count processing of the target pixel is not performed. On the other hand, in step S1701, if the gradation value Pv (X, Y) is 1 (YES in step S1701), the processing proceeds to step S1702. In other words, the pixel which is in the margin area and whose result of the binarization processing is 1 is determined as the processing target.

In step S1702, the consecutive pixels count unit 1502 determines whether the determination of all the gradation values Pv (X+xd, Y+yd) of the pixels neighboring the target pixel that exists in the margin area has been completed.

"xd" and "yd" are variables each of which is selected from among values −1, 0, and +1. The coordinates (X+xd, Y+yd) are the coordinates of the eight neighboring pixels of the target pixel. In other words, (xd, yd) is expressed as the following eight combinations.

(+1, +1), (+1, 0), (+1, −1), (0, +1), (0, −1), (−1, +1), (−1, 0), and (−1, −1)

The determination in step S1702 can be realized by implementing a pointer variable ptr_a, which is incremented each time one neighboring pixel is determined. Since there are eight neighboring pixels for one pixel, if the pointer variable ptr_a is 8, the consecutive pixels count unit 1502 determines that the determination of all the neighboring pixels has been completed. However, if the target pixel exists at an end of the left, right, top, and bottom sides, the consecutive pixels count unit 1502 determines that the determination of all the neighboring pixels has been completed when the pointer variable ptr_a is 5. Further, if the target pixel is at a corner, the consecutive pixels count unit 1502 determines that the determination of all the neighboring pixels has been completed when the pointer variable ptr_a is 3.

In step S1702, if the consecutive pixels count unit 1502 determines that the determination of all the neighboring pixels has not been completed (NO in step S1702), the processing proceeds to step S1703. In step S1703, one combination among the above-described eight combinations of (xd, yd) is assigned to xd and yd. The eight values are set in advance to the consecutive pixels count unit 1502 by the CPU 103 (Mxd [8], Myd [8]). By using the eight values, the coordinates of the neighboring pixels are generated in step S1705.

In step S1703, the values to be assigned to xd and yd are determined according to the value of the pointer variable ptr_a. After the values are assigned to xd and yd, in step S1704, the area determination unit 1501 increments the value of the pointer variable ptr_a. In step S1705, based on the values xd and yd determined in step S1704, the consecutive pixels count unit 1502 determines the gradation value Pv(X+xd, Y+yd) of the neighboring pixel.

If the gradation value Pv(X+xd, Y+yd) is 1, in other words, if the result of the binarization processing of the neighboring pixel is 1 (YES in step S1705), the processing proceeds to step S1706. In step S1706, the consecutive pixels count unit 1502 determines whether the coordinates are not determination-completed coordinates. If the coordinates are of the pixel, which has been once determined that the result of the binarization processing, has been 1 in step S1705, in step S1706, the coordinates are stored, and determination in the subsequent steps is realized by referring to the determined coordinates and the stored coordinates. According to the processing in step S1705, the gradation data of the neighboring pixel of the target pixel is checked. If the result of the binarization processing is 1, the pixel is determined that it is a neighboring pixel of the target pixel.

In step S1706, if the consecutive pixels count unit 1502 determines that determination of the coordinates is not completed (NO in step S1706), the processing proceeds to step S1707. In step S1707, the coordinates are stored. In step S1708, if the coordinates are stored in step S1707, a pointer variable ptr_b is incremented. The pointer variable ptr_b is used for determining the number of the neighboring pixels whose result of the binarization processing is 1. According to the example illustrated in FIG. 20, since the pixel whose result of the binarization processing is 1 is only a pixel 2001 on the left side among the neighboring pixels of the target pixel 2000, ptr_b=1 is obtained.

In step S1702, if it is determined that the determination processing of all the neighboring pixels has been completed (YES in step S1702), the processing proceeds to step S1709. In step S1709, the consecutive pixels count unit 1502 resets the pointer variable ptr_a (ptr_a=0) and decrements the pointer variable ptr_b (ptr_b−−).

In step S1710, the consecutive pixels count unit 1502 determines whether the contiguous neighboring pixels still exist. The determination is made according to whether the pointer variable ptr_b is a minus value. If the consecutive pixels count unit 1502 determines that the contiguous neighboring pixels still exist (NO in step S1710), the processing proceeds to step S1711. In step S1711, the coordinates stored in step S1707 (the coordinates of a pixel that exists in the vicinity of the target pixel and whose result of the binarization processing is 1) are called up. The pointer variable ptr_b is used when the coordinates are called up.

In step S1712, the consecutive pixels count unit 1502 determines whether the coordinates called up in step S1711 are located at the lower side of the upper boundary coordinates. The determination is made using the upper boundary coordinate Y_tb and the upper boundary vicinity flag ytb_flag. An evaluation formula (11) to be used in the determination is given below.

$$(ytb\_flag == 1) \&\& (Y == Y\_tb+1) \quad (11)$$

Regarding the above-described evaluation formula (11), (ytb_flag==1) indicates that the upper boundary coordinate Y_tb is the upper boundary pixel that exists in the margin area. Further, (Y==Y_tb+1) indicates that the Y coordinate of the pixel called up in step S1711 and whose result of the binarization processing is 1 among the neighboring pixels of the target pixel is located at the lower side of the upper boundary pixel (exists in the print information area).

In this manner, the consecutive pixels count unit 1502 determines whether the target pixels in the margin area and whose gradation value is 1 contiguously exist from the margin area to the print area.

As described above, if the evaluation formula is 1 (YES in step S1712), the processing proceeds to step S1716. In step S1716, the consecutive pixels count unit 1502 increments a count value cnt_m_sub.

On the other hand, if the result of the above-described evaluation formula is 0 (NO in step S1712), the processing proceeds to step S1713. In step S1713, the consecutive pixels count unit 1502 determines whether the coordinates called up in step S1711 are located at the upper side of the lower boundary coordinates. The determination is made using the lower boundary coordinate Y_bb and the lower boundary vicinity flag ybb_flag. An evaluation formula (12) to be used in the determination is given below.

$$(ybb\_flag == 1) \&\& (Y == Y\_bb-1) \quad (12)$$

If the result of the evaluation formula described above is 1 (YES in step S1713), the processing proceeds to step S1716. In step S1716, the consecutive pixels count unit 1502 increments the count value cnt_m_sub.

On the other hand, if the above-described evaluation formula is 0 (NO in step S1713), the processing proceeds to step S1714. In step S1714, the consecutive pixels count unit 1502 determines whether the coordinates called up in step S1711 are located at the right side of the left boundary coordinates. The determination is made using the left boundary coordinate X_lb and the left boundary vicinity flag xlb_flag. An evaluation formula (13) to be used in the determination is given below.

$$(xlb\_flag == 1) \&\& (X == X\_lb+1) \quad (13)$$

If the result of the above-described evaluation formula is 1 (YES in step S1714), the processing proceeds to step S1716. In step S1716, the consecutive pixels count unit 1502 increments the count value cnt_m_sub.

On the other hand, if the result of the above-described evaluation formula is 0 (NO in step S1714), the processing proceeds to step S1715. In step S1715, the consecutive pixels count unit 1502 determines whether the coordinates called up in step S1711 are located at the left side of the right boundary coordinates. The determination is made using the right boundary coordinate X_rb and the right boundary vicinity flag xrb_flag. An evaluation formula (14) to be used in the determination is given below.

$$(xrb\_flag == 1) \&\& (X == X\_rb-1) \quad (14)$$

If the result of above-described evaluation formula is 1 (YES in step S1715), the processing proceeds to step S1716. In step S1716, the consecutive pixels count unit 1502 increments the count value cnt_m_sub. This is a pixel 2002 in FIG. 20.

On the other hand, if the result of the above-described evaluation formula is 0 (NO in step S1715), the processing returns to step S1702 and the consecutive pixels count unit 1502 determines the above-described gradation value regarding the neighboring pixel of the pixel called up in step S1711.

In other words, the target pixel is changed to the pixel 2001, and similar processing is performed for the neighboring pixels. In this manner, since the target pixel is changed one by one, the coordinates of the pixel whose gradation value is 1 and contiguously exists from the margin area are stored. Then, the consecutive pixels count unit 1502 determines whether the stored coordinates have reached the print information area.

If the result of the determination in steps S1700 is 1, or if the result of the determination in steps S1701 is 0 or if the result of the determination in step S1710 is 1, the processing proceeds to step S1717. In step S1717, the consecutive pixels count unit 1502 determines whether the target pixel is the last pixel. The consecutive pixels count unit 1502 causes the area determination unit 1501 to make the determination using the end_flag added to the image data. If 0 is set to the end_flag (NO in step S1717), the processing returns to step S1700, and the determination of the next target pixel will be performed. If 1 is set to the end_flag (YES in step S1717), an integrated value of the count value cnt_m_sub is transferred to the comparison determination unit 1503, and then the processing ends.

Figure 18:
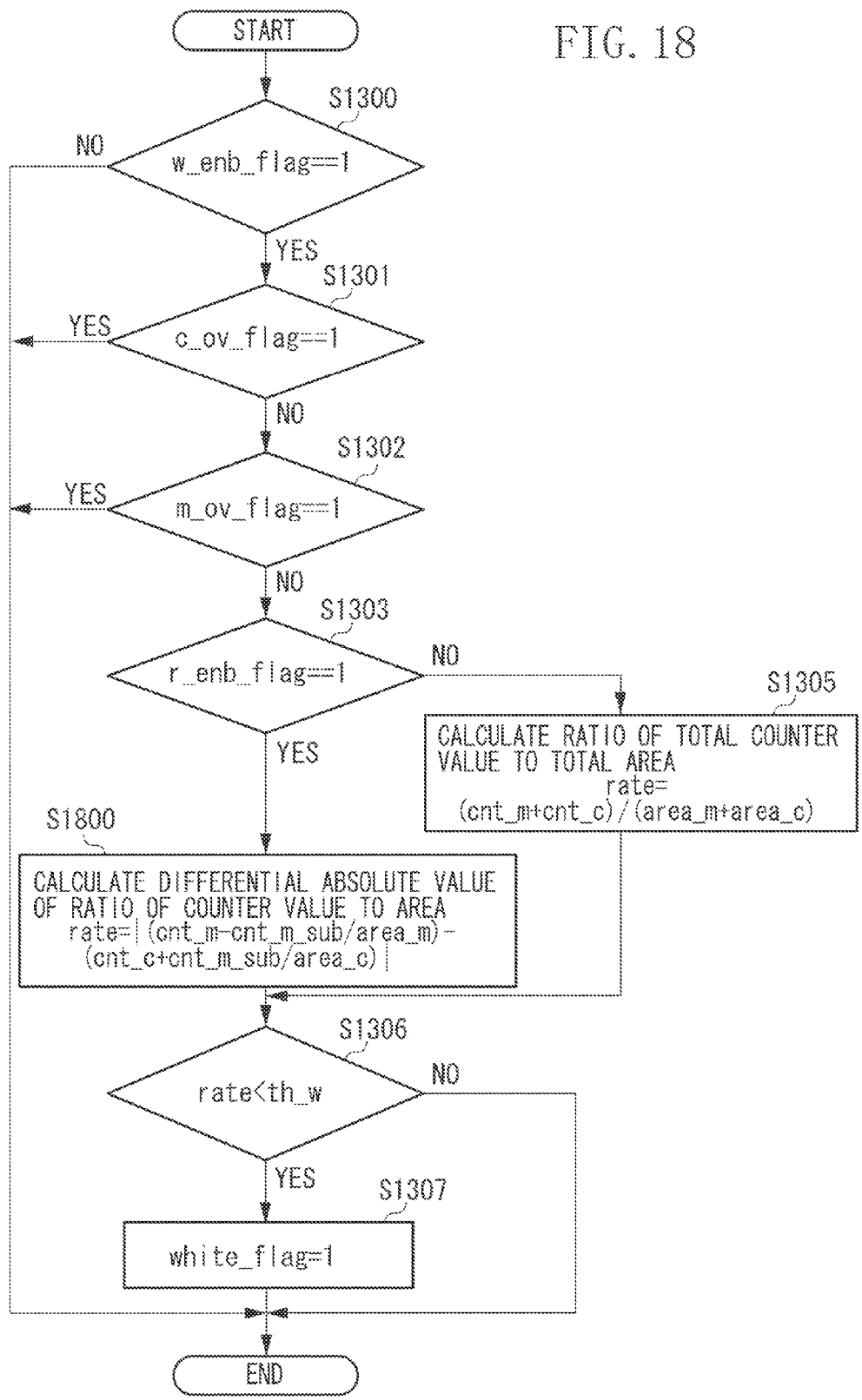
FIG. 18 is a flowchart illustrating processing of a comparison determination unit according to the second exemplary embodiment.

Next, detailed processing flow of the comparison determination unit 1503 according to the present exemplary embodiment will be described with reference to FIG. 18. A program code for realizing each step of the flowchart is stored in the storage unit 107 and executed by the CPU 103.

Since steps S1300 to S1307 are similar to those described with reference to FIG. 14, their descriptions are not repeated. Only step S1800 different from the processing in FIG. 14 will be described.

In step S1303, if the low-quality paper processing function valid flag r_enb_flag is 1 (YES in step S1303), the processing proceeds to step S1800. In step S1800, the comparison determination unit 1503 performs calculation using the count value, the print information area, and the margin area. A calculating formula (15) is used in the calculation.

$$|(cnt\_m - cnt\_m\_sub/area\_m) - (cnt\_c + cnt\_m\_sub/area\_c)| \quad (15)$$

The CPU 103 sets the margin area area_m and the print information area area_c to the comparison determination unit 1503 based on the size of the document read by the scanner 114 and the margin information set on the margin setting screen 700.

As the calculating formula (15) shows, the boundary contiguous pixel is subtracted from the count value regarding the margin area and the boundary contiguous pixel is added to the count value regarding the print information area.

Further, if the value of the count value cnt_m_sub is greater than a predetermined value, it is highly possible that the margin setting includes an error, so that a screen prompting the user to reset the margin may be displayed. Further, the processing can automatically proceed to step S1305.

As described above, according to the present exemplary embodiment, the scanned image data is binarized, and further divided into the margin area and the print information area. Then, the binarized data is counted in each area. Further, the contiguous pixels that extend across the print information area and the margin area are separately counted as boundary contiguous pixels. Since a difference between the count result of the boundary contiguous pixels and the count result of the pixels in the margin area is calculated, the count value of the object that extends off the print information area can be subtracted from the count result of the margin area. In other words, even if the area set by the user via the margin setting screen 700 is not accurate, the white paper can be detected without reducing the accuracy.

Aspects of the present invention can also be realized by a computer of a system or apparatus (or devices such as a CPU or a micro processing unit (MPU)) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-027319 filed Feb. 10, 2011, which is hereby incorporated by reference herein in its entirety.

What is claimed is:

1. An apparatus comprising:
an input unit configured to read a document and input image data;
a division unit configured to divide the image data into a margin area and a print information area;
an acquisition unit configured to count a number of pixels having a gradation value greater than a first threshold value in each divided area, and acquire the number of counted pixels per unit area; and
a determination unit configured to determine that the document is white paper if a difference of two acquired pixel numbers per unit area is smaller than a second threshold value.

2. The apparatus according to claim 1, further comprising a binarization unit configured to binarize the image data;
wherein the division unit divides the binarized image data into the margin area and the print information area; and
the acquisition unit counts the number of pixels whose result of binarization processing is 1 in each divided area.

3. The apparatus according to claim 1, wherein the division unit divides the image data into the margin area and the print information area using the margin area set by a user via a display screen.

4. The apparatus according to claim 1, further comprising, if a first pixel having the gradation value greater than the first threshold value exists in the margin area and a second pixel which adjoins the first pixel is included in the print information area and has the gradation value greater than the first threshold value, a consecutive pixels count unit configured to acquire a count value of the number of the first pixel,
wherein a value of the first pixel counted by the consecutive pixels count unit is subtracted from the number of pixels in the margin area counted by the acquisition unit and added to the number of pixels in the print information area counted by the acquisition unit.

5. The apparatus according to claim 1, wherein if a value of the margin area counted by the acquisition unit is greater than a third threshold value, the document is not considered as a determination target of the determination unit.

6. A method for controlling an apparatus, the method comprising:
   reading a document and inputting image data;
   dividing the input image data into a margin area and a print information area;
   counting a number of pixels having a gradation value greater than a first threshold value in each divided area and acquiring the number of counted pixels per unit area; and
   determining that the document is white paper if a difference of two acquired pixel numbers per unit area is smaller than a second threshold value.

7. The method according to claim 6, further comprising:
   binarizing the input image data;
   dividing the binarized image data into the margin area and the print information area; and
   counting the number of pixels whose result of binarization processing is 1 in each divided area.

8. The method according to claim 6, further comprising dividing the image data into the margin area and the print information area using the margin area set by a user via a display screen.

9. The method according to claim 6, further comprising:
   if a first pixel having the gradation value greater than the first threshold value exists in the margin area and a second pixel which adjoins the first pixel is included in the print information area and has the gradation value greater than the first threshold value, acquiring a count value of the number of the first pixel; and
   subtracting a value of the first pixel from the number of pixels counted in the margin area and adding the value of the first pixel to the number of pixels counted in the print information area.

10. A non-transitory computer readable storage medium for storing a computer-executable program of instructions for causing a computer to perform a method comprising:
    reading a document and inputting image data;
    dividing the input image data into a margin area and a print information area;
    counting a number of pixels having a gradation value greater than a first threshold value in each divided area and acquiring the number of counted pixels per unit area; and
    determining that the document is white paper if a difference of two acquired pixel numbers per unit area is smaller than a second threshold value.

11. The non-transitory computer readable storage medium according to claim 10, further comprising:
    binarizing the input image data;
    dividing the binarized image data into the margin area and the print information area; and
    counting the number of pixels whose result of binarization processing is 1 in each divided area.

12. The non-transitory computer readable storage medium according to claim 10, further comprising dividing the image data into the margin area and the print information area using the margin area set by a user via a display screen.

13. The non-transitory computer readable storage medium according to claim 10, further comprising:
    if a first pixel having the gradation value greater than the first threshold value exists in the margin area and a second pixel which adjoins the first pixel is included in the print information area and has the gradation value greater than the first threshold value, acquiring a count value of the number of the first pixel; and
    subtracting a value of the first pixel from the number of pixels counted in the margin area and adding the value of the first pixel to the number of pixels counted in the print information area.

* * * * *